(12) United States Patent
Tanaka et al.

(10) Patent No.: US 10,125,716 B2
(45) Date of Patent: Nov. 13, 2018

(54) CONTROL APPARATUS FOR DIESEL ENGINE AND CONTROL METHOD FOR DIESEL ENGINE

(71) Applicant: NGK SPARK PLUG CO., LTD., Nagoya-shi, Aichi (JP)

(72) Inventors: Takafumi Tanaka, Gifu (JP); Tetsuhara Honma, Nagoya (JP); Toshiyuki Nakamura, Nagoya (JP); Manabu Okinaka, Kani (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 160 days.

(21) Appl. No.: 14/798,790

(22) Filed: Jul. 14, 2015

(65) Prior Publication Data

US 2016/0017836 A1    Jan. 21, 2016

(30) Foreign Application Priority Data

Jul. 15, 2014 (JP) .................................. 2014-144748

(51) Int. Cl.
*F02D 41/40* (2006.01)
*F02D 41/12* (2006.01)
(Continued)

(52) U.S. Cl.
CPC ......... *F02D 41/401* (2013.01); *F02D 35/023* (2013.01); *F02D 41/126* (2013.01);
(Continued)

(58) Field of Classification Search
CPC .... F02D 41/401; F02D 41/26; F02D 41/3827; F02D 41/3064; F02D 41/126;
(Continued)

(56) References Cited

U.S. PATENT DOCUMENTS 7,729,843 B2    6/2010 Ishikawa
2004/0011042 A1 *  1/2004 Inoue ...................... F23R 3/283
                                                         60/737

(Continued)

FOREIGN PATENT DOCUMENTS

DE    102008004361 A1    7/2009
DE    102008004365 A1    7/2009
(Continued)

OTHER PUBLICATIONS

Communication dated Dec. 11, 2015 from the European Patent Office in counterpart application No. 15175971.9.
(Continued)

*Primary Examiner* — Hung Q Nguyen
*Assistant Examiner* — Xiao Mo
(74) *Attorney, Agent, or Firm* — Sughrue Mion, PLLC

(57) ABSTRACT

A control apparatus (100) controls a diesel engine (10). A glow plug (32) which can detect cylinder pressure is provided on the engine (10). An ECU (70) computes a parameter related to a change in cylinder pressure obtained from the glow plug (32). The ECU (70) controls fuel injection timing such that the parameter falls within a target range when combustion in the engine (10) is switched from premixed combustion to diffusion combustion.

20 Claims, 19 Drawing Sheets

(51) Int. Cl.

| | |
|---|---|
| *F02D 41/30* | (2006.01) |
| *F02P 19/02* | (2006.01) |
| *F02D 35/02* | (2006.01) |
| *F23Q 7/00* | (2006.01) |
| *F02D 41/26* | (2006.01) |
| *F02D 41/38* | (2006.01) |
| *F02M 26/05* | (2016.01) |

(52) U.S. Cl.
CPC ......... *F02D 41/26* (2013.01); *F02D 41/3035* (2013.01); *F02D 41/3064* (2013.01); *F02D 41/3827* (2013.01); *F02M 26/05* (2016.02); *F02P 19/026* (2013.01); *F02P 19/028* (2013.01); *F23Q 7/001* (2013.01); *F02D 35/028* (2013.01); *F23Q 2007/005* (2013.01); *Y02T 10/44* (2013.01)

(58) Field of Classification Search
CPC .. F02D 41/3035; F02D 35/023; F02D 35/028; F02M 26/05; F23Q 7/001; F23Q 2007/005; F02P 19/026; F02P 19/028; Y02T 10/44
See application file for complete search history.

(56) References Cited

U.S. PATENT DOCUMENTS

| | | |
|---|---|---|
| 2005/0229903 A1 | 10/2005 | Kobayashi et al. |
| 2007/0245805 A1* | 10/2007 | Schricker ............... F23Q 7/001 73/35.12 |
| 2009/0024305 A1 | 1/2009 | Ishikawa |
| 2009/0182484 A1 | 7/2009 | Loeffler et al. |
| 2009/0182485 A1 | 7/2009 | Loeffler et al. |
| 2010/0031924 A1 | 2/2010 | Sun et al. |
| 2010/0292908 A1 | 11/2010 | Okinaka et al. |
| 2011/0114622 A1* | 5/2011 | Sekiguchi ............... F23Q 7/001 219/270 |
| 2012/0016571 A1 | 1/2012 | Nada |
| 2012/0216776 A1* | 8/2012 | Nagatsu ............... F02B 23/101 123/305 |
| 2013/0024097 A1 | 1/2013 | Nada |
| 2013/0073185 A1* | 3/2013 | Hellstrom ............. F02D 35/025 701/104 |
| 2013/0269640 A1 | 10/2013 | Nakamura et al. |

FOREIGN PATENT DOCUMENTS

| | | |
|---|---|---|
| EP | 1538325 A1 | 6/2005 |
| EP | 2251539 A2 | 11/2010 |
| EP | 2551499 A1 | 1/2013 |
| JP | 2004-100566 A | 4/2004 |
| JP | 2007-211612 A | 8/2007 |
| JP | 2010-071197 A | 4/2010 |
| JP | 2010-121490 A | 6/2010 |
| JP | 2010-236459 A | 10/2010 |
| JP | 2012-177483 A | 9/2012 |

OTHER PUBLICATIONS

"2,0-L-Biturbo-Dieselmotor Von Opel Mit Zweistufen-Ladeluftkuhlung", MTZ Motortechnische Zeitschrift, Vieweg Verlag, Wiesbaden, DE, vol. 73, No. 7/8, Jul. 1, 2012 (Jul. 1, 2012), pp. 574-579, XP001577207, ISSN: 0024-8525.

Communication dated Jan. 30, 2018, issued by the Japan Patent Office in corresponding Japanese Application No. 2014-144748.

* cited by examiner

CONTROL APPARATUS FOR DIESEL ENGINE AND CONTROL METHOD FOR DIESEL ENGINE

BACKGROUND OF THE INVENTION

1. Field of the Invention

The present invention relates to control of a diesel engine.

2. Description of the Related Art

Conventionally, a technique has been proposed for controlling a diesel engine in a combustion form (mode) corresponding to the load of the engine (see, for example, Patent Document 1 listed below). Combustion forms (also called "combustion modes") of fuel employed in such engine control include a diffusion combustion mode for combusting fuel while injecting the fuel into a combustion chamber, and a premixed combustion mode (also called a "homogeneous-charge compression combustion mode") for mixing fuel and air within a combustion chamber before igniting the fuel. In the following description, the diffusion combustion mode and the premixed combustion mode are also referred to as "diffusion combustion" and "premixed combustion," respectively.

In general, diffusion combustion is used when the engine is in a high-load state, and premixed combustion is used when the engine is in a low-load state. In premixed combustion, EGR control is concurrently used for re-circulating a large amount of exhaust gas to the intake side. It has been known that the amounts of NOx, soot, etc., can be reduced by switching the combustion mode to the premixed combustion mode.

During a transition period of switching the combustion mode, nitrogen oxide (NOx), soot (soot itself or opacity of exhaust gas), combustion noise, etc., may be generated or their amounts may increase. Examples of such a transition period of switching the combustion mode include a transition period of switching from diffusion combustion to premixed combustion, a transition period of switching from premixed combustion to diffusion combustion, and a transition period of switching from motoring to premixed combustion. In order to solve the above-described problems, Patent Document 2 listed below proposes to divide fuel injection into pilot injection and main injection, and to finely adjust an increase or decrease in fuel injection amount during the transition period.

[Patent Document 1] Japanese Patent Application Laid-Open (kokai) No. 2007-211612

[Patent Document 2] Japanese Patent Application Laid-Open (kokai) No. 2010-236459

3. Problems to be Solved by the Invention

It has been known that when premixed combustion or diffusion combustion takes place in a diesel engine, fuel injection timing and EGR amount greatly affect the combustion. However, immediately after switching the combustion mode, the EGR amount cannot be controlled properly due to, for example, a temporal delay in introduction of exhaust gas. Heretofore, a parameter for properly controlling fuel injection timing during the transition period of switching the combustion mode has not been known.

Data from various types of sensors such as an intake pressure sensor, an air flow sensor, an exhaust oxygen sensor, and an intake temperature sensor are influenced by factors which are difficult to predict, such as fuel properties, changes in the cooling water temperature, and deterioration of various sensor types with time. Therefore, in the case where a predictive value of the EGR ratio or the oxygen concentration of intake gas is obtained using a model and based on sensor data and the fuel injection timing during the transition period of switching the combustion mode is controlled based on the predictive value, it is necessary to take measures such as providing initial control boundaries in consideration of these factors. As described above, even a method utilizing a model cannot accurately predict the oxygen concentration of intake gas, etc. Therefore, it has been difficult to improve the combustion state by increasing accuracy in controlling the fuel injection timing during the transition period of switching the combustion mode.

SUMMARY OF THE INVENTION

The present invention has been accomplished so as to solve, at least in part, the above-described problems of the related art.

It is therefore an object of the present invention to provide a technique and control apparatus which can improve the state of combustion during transition periods of switching the combustion mode of a diesel engine.

The above objects have been achieved by providing, according to a first mode (1) of the present invention, a diesel engine control apparatus for controlling fuel injection timing of a diesel engine having a combustion cylinder. The diesel engine control apparatus comprises a cylinder pressure sensor, a parameter computation unit, and a control unit. The cylinder pressure sensor detects a cylinder pressure of the diesel engine. The parameter computation unit computes a parameter which is related to a change in the cylinder pressure of the diesel engine obtained from a signal output from the cylinder pressure sensor. The control unit performs a transition period control for controlling fuel injection timing such that the parameter falls within a target range when combustion in the diesel engine is switched from premixed combustion to diffusion combustion. According to investigations made by the present inventors, a change in the cylinder pressure of the diesel engine strongly correlates with the EGR ratio or oxygen concentration of intake gas and fuel injection timing. Accordingly, the diesel engine control apparatus of this mode can properly control fuel injection timing during a transition period immediately after the combustion mode of the diesel engine is switched. Accordingly, at least one of combustion noise, NOx, and soot which are used as combustion indexes of the diesel engine is improved as compared with conventional diesel engines.

In a preferred embodiment (2) of the diesel engine control apparatus according to (1) above, the parameter computation unit computes, as the parameter, a pressure increase rate maximum value of the cylinder pressure or a heat generation rate maximum value based on the signal output from the cylinder pressure sensor; and the control unit controls the fuel injection timing based on the pressure increase rate maximum value or the heat generation rate maximum value in the transition period control. According to the diesel engine control apparatus (2), the controllability of fuel injection timing during the transition period of switching of the combustion mode of the diesel engine is further improved.

In another preferred embodiment (3) of the diesel engine control apparatus according to (1) or (2) above, the transition period control is also performed when the combustion in the diesel engine is switched from diffusion combustion to premixed combustion. According to the diesel engine control apparatus (3), the controllability of fuel injection timing is enhanced not only during the transition period of switching from premixed combustion to diffusion combustion but also during the transition period of switching from diffusion combustion to premixed combustion.

According to a second mode (4), the present invention provides a diesel engine control apparatus for controlling fuel injection timing of a diesel engine. The diesel engine control apparatus comprises a cylinder pressure sensor and a control unit. The cylinder pressure sensor detects the cylinder pressure of the diesel engine. The control unit controls fuel injection timing based on at least one of a pressure increase rate maximum value and a heat generation rate maximum value which are parameters obtained from a signal output from the cylinder pressure sensor, when combustion in the diesel engine is switched from premixed combustion to diffusion combustion. Accordingly, the diesel engine control apparatus (4) can properly control the fuel injection timing during a transition period immediately after switching the combustion mode of the diesel engine. Consequently, at least one of combustion noise, NOx, and soot which are used as indexes of combustion of the diesel engine is improved as compared with conventional diesel engines.

In a preferred embodiment (5) of the diesel engine control apparatus according to (4) above, the control unit controls the fuel injection timing such that at least one of the pressure increase rate maximum value and the heat generation rate maximum value falls within a target range, when combustion in the diesel engine is switched from premixed combustion to diffusion combustion. According to the diesel engine control apparatus (5), the controllability of fuel injection timing during the transition period of switching the combustion mode is further improved.

In another preferred embodiment (6) of the diesel engine control apparatus according to (4) or (5) above, the control unit controls the fuel injection timing based on at least one of the pressure increase rate maximum value, the heat generation rate maximum value, and a mass fraction burned when combustion in the diesel engine is switched from diffusion combustion to premixed combustion. According to the diesel engine control apparatus (6), the controllability of fuel injection timing is enhanced not only during the transition period of switching from premixed combustion to diffusion combustion, but also during the transition period of switching from diffusion combustion to premixed combustion.

In yet another preferred embodiment (7) of the diesel engine control apparatus according to any of (1) to (6) above, the cylinder pressure sensor is incorporated into a glow plug provided on the diesel engine. According to the diesel engine control apparatus (7), it becomes unnecessary to separately provide a cylinder pressure sensor in the cylinder, whereby the influence on combustion within the cylinder can be mitigated.

In yet another preferred embodiment (8) of the diesel engine control apparatus according to (7) above, the control unit energizes the glow plug such that a temperature of the glow plug is 900° C. or higher when combustion in the diesel engine is switched from premixed combustion to diffusion combustion. According to the diesel engine control apparatus (8), the state of combustion during the transition period of switching the combustion mode is enhanced by energizing the glow plug. As a result, cycle variation is reduced, and the range within which the fuel injection timing can be changed to cope with torque variation expands to the retarded side. Therefore, the diesel engine can be effectively controlled.

In yet another preferred embodiment (9) of the diesel engine control apparatus according to (8) above, the glow plug has a temperature rising speed such that the glow plug reaches 1200° C. within a period of 0.5 sec to 3 sec. According to the diesel engine control apparatus (9), during the transition period of switching the combustion mode, a state in which the diesel engine can be effectively controlled can be established within a short period of time as a result of the temperature increase of the glow plug.

According to a third mode (10), the present invention provides a method for controlling fuel injection timing of a diesel engine. This method comprises a cylinder pressure detection step, a computation step, and a control step. The cylinder pressure detection step detects a cylinder pressure of the diesel engine. The computation step computes, based on the detected cylinder pressure, a parameter which is related to a change in the cylinder pressure of the diesel engine. The control step controls the fuel injection timing such that the parameter falls within a target range when combustion in the diesel engine is switched from premixed combustion to diffusion combustion. According to the method (10), the fuel injection timing during the transition period of switching the combustion mode of the diesel engine can be properly controlled.

According to a fourth mode (11), the present provides another method for controlling fuel injection timing of a diesel engine. This method comprises a cylinder pressure detection step and a control step. The cylinder pressure detection step detects a cylinder pressure of the diesel engine. The control step controls the fuel injection timing, based on at least one of a pressure increase rate maximum value and a heat generation rate maximum value which are parameters obtained from the cylinder pressure, when combustion in the diesel engine is switched from premixed combustion to diffusion combustion. According to the method (11), the fuel injection timing during the transition period of switching the combustion mode of the diesel engine can be properly controlled.

The present invention can be realized in various forms in addition to the above-described diesel engine control apparatuses and control methods. For example, the present invention can be realized in the form of, for example, a computer program for carrying out a diesel engine control method, a non-temporary recording medium on which the computer program is recorded, or a method of manufacturing a diesel engine control apparatus. Notably, each of the diesel engine control apparatuses of the present invention can be embodied as a diesel engine control system.

DESCRIPTION OF REFERENCE NUMERALS

Figure 1:
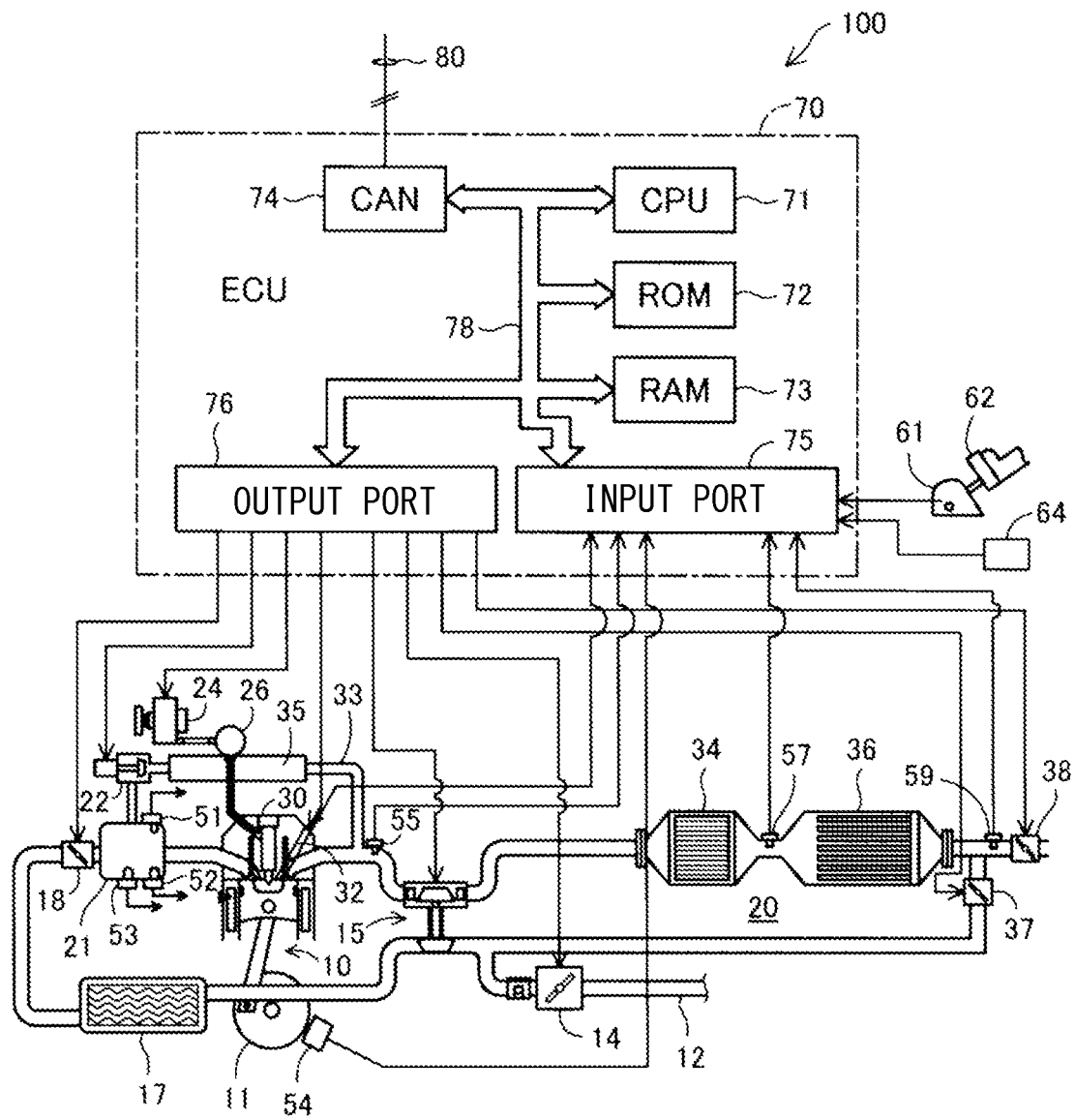
FIG. 1 is a schematic diagram showing the configuration of a control apparatus for a diesel engine.

Reference numerals used to identify various features in the drawings include the following.
10: engine
11: gear wheel
12: intake pipe inlet
14: intake valve
15: turbocharger
17: inter cooler
18: inter cooler passage throttle valve
21: intake manifold
22: second EGR valve
24: fuel supply pump
26: common rail
30: fuel injection valve
32: glow plug
33: branch pipe
34: oxidation catalyst
35: EGR cooler
36: exhaust filter
37: first EGR valve
38: exhaust shutter
51: intake gas temperature sensor
52: intake pressure sensor
53: oxygen concentration sensor
54: rotational angle sensor
55: exhaust gas temperature sensor
57: opacity sensor
59: NOx sensor
61: accelerator sensor
62: accelerator
64: vehicle speed sensor
70: ECU
71: CPU
72: ROM
73: RAM
74: CAN
75: input port
76: output port
78: bus
80: in-vehicle LAN
100: control apparatus
200: ceramic heater
201: substrate
202: resistance heating element
204: first terminal portion
206: second terminal portion
210: center rod
212: terminal spring
214: terminal member
220: outer tube
222: sleeve
230: support member
231: forward end portion
240: housing
241: front cap
250: elastic member
255: diaphragm
260: pressure sensor

DETAILED DESCRIPTION OF THE PREFERRED EMBODIMENTS

The present invention will now be described in greater detail by reference to the drawings. However, the present invention should not be construed as being limited thereto.

A. First Embodiment:

(1) Hardware Configuration of Control Apparatus

FIG. 1 is a schematic diagram showing the configuration of a control apparatus 100 for a diesel engine, which is a first embodiment of the present invention. The control apparatus 100 is mainly composed of an engine 10; an intake-exhaust system 20 which performs intake and exhaust operations, including recirculation of exhaust gas, for the engine 10; a fuel injection value 30 for supplying fuel (light oil) to the engine 10; and an ECU 70 for controlling the entire operation of the engine 10.

The engine 10 is a four-cylinder, direct-injection-type diesel engine (hereinafter also referred to as an engine). The engine 10 includes four cylinders, and a piston is provided in each cylinder. Motion of the piston pushed downward as a result of combustion of fuel is converted to rotational motion of a crankshaft through a connecting rod. A rotational angle sensor 54 is provided to face the outer periphery of a gear wheel 11 coupled to the crankshaft, and accurately detects the rotational angle of the crankshaft (hereinafter referred to as the "crank angle CA"). The shape of the gear wheel is determined such that the top dead center TDC and bottom dead center BDC of the piston in each cylinder are also detected.

The above-mentioned fuel injection valve 30 and a glow plug 32 including a cylinder pressure sensor are provided on the cylinder head of the engine 10. The glow plug 32 functions as a heater for assisting combustion and stabilizing combustion at low temperatures, and also functions as a cylinder pressure sensor for detecting the cylinder pressure of the engine 10. The structure of the glow plug 32 will be described in detail below.

Also, a water temperature sensor for detecting the temperature of cooling water and other components are provided on the engine 10. In response to an instruction from the ECU 70, the fuel injection valve 30 opens so as to inject high-pressure fuel supplied from a fuel supply pump 24 via a common rail 26 into a cylinder of the engine 10. The timing of this injection represented by a crank angle from the top dead center TDC is the fuel injection timing. An operation of advancing the fuel injection timing in the crank angle CA will be referred to as "controlling the fuel injection timing toward the advance side," and an operation of retarding the fuel injection timing in the crank angle CA will be referred to as "controlling the fuel injection timing toward the retarded side (retarding the fuel injection timing)."

Next, the intake-exhaust system 20 will be described. Oxygen required for combustion in the engine 10 is derived from fresh air introduced from the outside. Fresh air is introduced from an intake pipe inlet 12 through an unillustrated air filter, and is taken into the intake-exhaust system 20 through an intake valve 14. The engine 10 takes in this fresh air and exhaust gas recirculated from an exhaust system as a result of recirculation of exhaust gas, and uses them for combustion. In the following description, fresh air and exhaust gas which are taken in by the engine 10 will be collectively referred to as "intake gas." A mixture of intake gas taken into the cylinder and fuel injected from the fuel injection valve 30 will be referred to as "gas-fuel mixture."

The intake-exhaust system 20 includes a turbocharger 15, an inter cooler 17, an inter cooler passage throttle valve 18, and an intake manifold (hereinafter also referred to as "manifold") 21 which are provided in this order from the upstream side between the intake pipe inlet 12 and the intake port of the engine 10. Meanwhile, on the downstream side of the exhaust port of the engine 10, a branch pipe 33, an exhaust side turbine of the turbocharger 15, an oxidation catalyst 34, an exhaust filter (DPF) 36, and an exhaust shutter 38 are provided. Although components on the downstream side of the exhaust shutter 38 are not illustrated, a well-known muffler, etc., are provided, and exhaust gas is released to the atmosphere after being purified by the oxidation catalyst 34 and the DPF 36.

A first EGR valve 37 is provided in a branch passage that branches off at a position before the exhaust shutter 38. The branch passage is connected to a flow passage through which fresh air is introduced from the intake pipe inlet 12, and a portion of the exhaust gas is mixed with the fresh air there. A mixture of the fresh air and the exhaust gas is introduced into the intake side passage of the turbocharger 15. The turbocharger 15 rotates the exhaust side turbine disposed in the exhaust passage extending from the engine 10 through use of the exhaust gas discharged from the engine 10. The exhaust side turbine is connected directly to an intake side turbine disposed on the intake side, and rotates the intake side turbine. As a result of rotation of the intake side turbine, the engine 10 is supercharged with the intake gas.

As a result of supercharging by the turbocharger 15, the temperature of the intake gas increases due to adiabatic compression. The inter cooler 17 is provided so as to cool the intake gas. Since the intake gas (fresh air and exhaust gas) cooled by the inter cooler 17 is introduced into the engine 10 through the manifold 21, the exhaust gas is recirculated. The amount of recirculated exhaust gas can be controlled by adjusting the opening of the first EGR valve 37. This passage is referred to as the "first EGR passage."

Meanwhile, a branch pipe 33 provided immediately after the exhaust port of the engine 10 is connected to the manifold 21 via an EGR cooler 35 and a second EGR valve 22. This passage is referred to as a second EGR passage for recirculating the exhaust gas from the exhaust side of the engine 10 to the intake side thereof. The EGR amount can be controlled by adjusting the opening of the second EGR valve 22 and the opening of the inter cooler passage throttle valve 18 provided immediately before the manifold 21.

A large number of sensors are provided in the above-described intake-exhaust system 20. An intake gas temperature sensor 51 for detecting the temperature of the intake gas, an intake pressure sensor 52 for detecting the intake pressure, and an oxygen concentration sensor 53 for detecting the oxygen concentration of the intake gas (hereinafter also referred to as the "intake oxygen concentration") are provided on the manifold 21. An exhaust gas temperature sensor 55 for detecting the temperature of the exhaust gas is provided downstream of the branch pipe 33, and an opacity sensor 57 for detecting the opacity of the exhaust gas (the amount of generated soot) is provided before the DPF 36. Further, an NOx sensor 59 for detecting the amount of NOx is provided before the exhaust shutter 38. Of these sensors, the oxygen concentration sensor 53, the opacity sensor 57, the NOx sensor 59, etc., are provided so as to measure the performance of the engine control apparatus 100, which will be described below, and are not necessarily required for control of the engine 10 mounted on a vehicle. Other sensors may be omitted if they are not required for engine control. In the case where the various sensors such as the NOx sensor are not provided, the effects of the control apparatus of the embodiment may be confirmed by measuring various parameters through use of an exhaust gas analyzer, an opacimeter, etc., in a bench test.

The above-described various sensors and actuators such as valves are connected to the ECU 70. The ECU 70 includes a CPU 71 for performing control, a ROM 72, a RAM 73, a CAN 74 for performing communications with an in-vehicle LAN 80, an input port 75 for receiving signals from the sensors, an output port 76 for outputting drive signals to the various valves, and a bus 78 to which these elements and the ports are connected. Various sensors for detecting the operating state of the vehicle, such as an accelerator sensor 61 for detecting the depression amount of an accelerator 62 (hereinafter referred to as the "accelerator depression amount □") and a vehicle speed sensor 64, are also connected to the input port 75. The ECU 70 functions as a parameter computation unit for computing a parameter related to change in the cylinder pressure, and also functions as a control unit for executing transition period control which will be described below.

Figure 2:
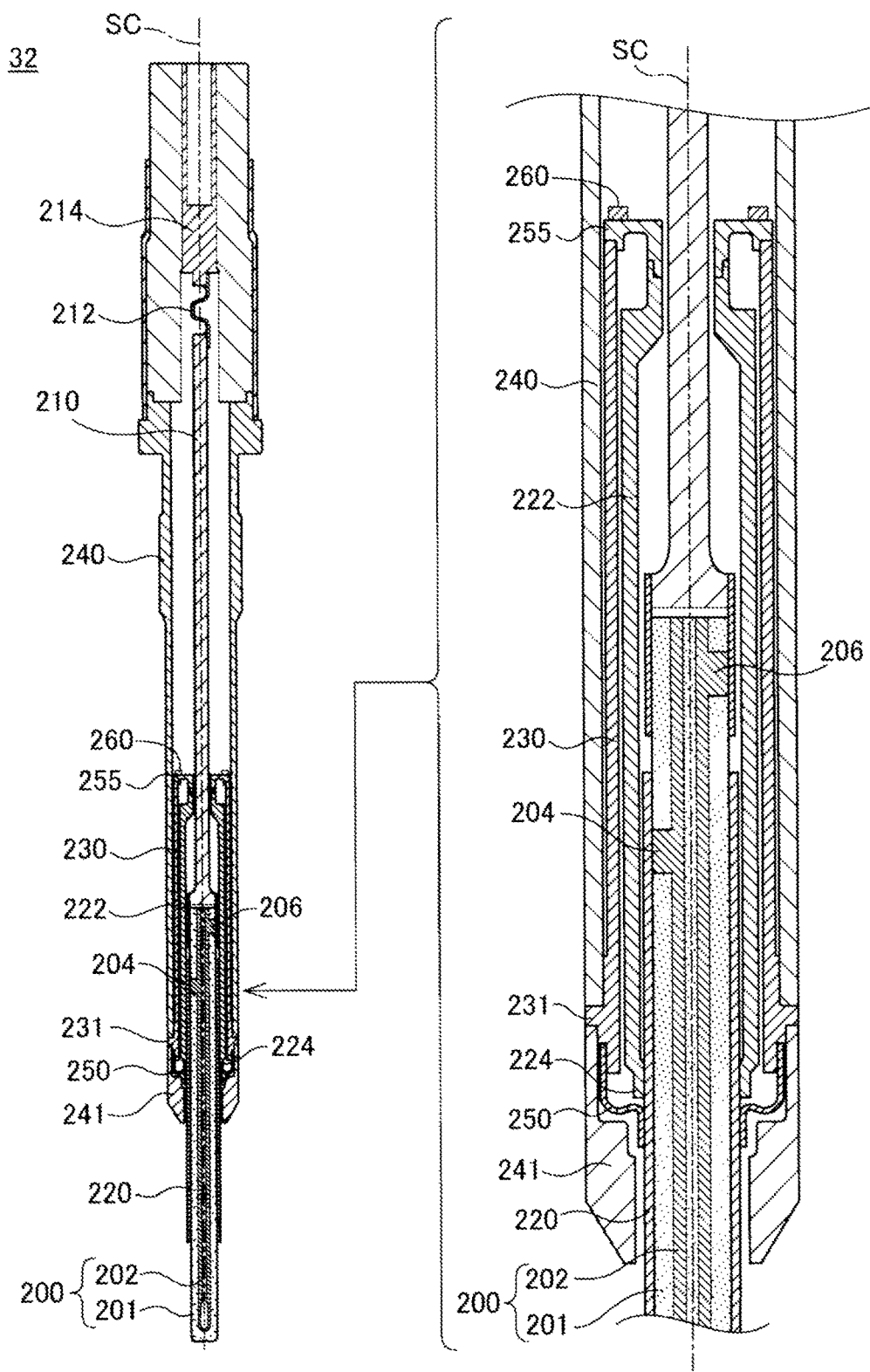
FIG. 2 is a schematic cross-sectional view showing the structure of a glow plug.

FIG. 2 is a schematic cross-sectional view showing the structure of the glow plug 32 provided on the cylinder head of the engine 10. The glow plug 32 has a rod-shaped ceramic heater 200 (heat generation element) provided at a forward end portion thereof which is inserted into the cylinder of the engine 10. The ceramic heater 200 include a substrate 201 and a resistance heating element 202.

The substrate 201 is formed of an insulating ceramic material, and holds and covers the resistance heating element 202 provided at the center thereof. The resistance heating element 202 generates heat when electric current is supplied thereto through first and second terminal portions 204 and 206. The first terminal portion 204 is electrically connected to an outer tube 220. The second terminal portion 206 is electrically connected to a cylindrical columnar center rod 210 disposed on the axis SC of the glow plug 32. The second terminal portion 206 receives externally supplied electric power through the center rod 210, and a terminal spring 212 and a terminal member 214, which are electrically connected to the center rod 210.

The ceramic heater 200 of the present embodiment reaches a temperature of 900° C. or higher within a short period of time when energized. Specifically, the ceramic heater 200 reaches 1200° C. within a period of time shorter than that in the case of a metal heater (0.5 to 3.0 sec in the present embodiment). Therefore, even when intake gas creates a cooling environment inside the cylinder of the engine 10, the glow plug 32 can heat the interior of the cylinder to a temperature of about 1200° C. within a short period of time. The glow plug 32 of the present embodiment also functions as a cylinder pressure sensor because it has the following structure.

In the glow plug 32, the ceramic heater 200 is fitted into the outer tube 220, which is a cylindrical metallic member, such that forward and rear end portions of the ceramic heater 200 project from the outer tube 220. The outer tube 220 is accommodated within a sleeve 222, which is a cylindrical metallic member, such that its forward end portion projects from the sleeve 222. The outer tube 220 is welded to a joint portion 224 provided at a forward-end-side opening portion of the sleeve 222.

The sleeve 222 is accommodated within a cylindrical support member 230 extending such that its center coincides with the axis SC. A gap is formed between the outer circumferential surface of the sleeve 222 and the inner circumferential surface of the support member 230. A forward end portion 231 of the support member 230 is joined to a forward-end-side open end portion of a cylindrical housing 240 and to a rear-end-side open end portion of a cylindrical front cap 241 disposed on the forward end side of the housing 240.

The outer tube 220, which holds the ceramic heater 200, is connected to the support member 230 and the housing 240 through an elastic member 250. The ceramic heater 200 projects forward from the opening portion of the front cap 241 in a state in which elastic deformation of the elastic member 250 allows the ceramic heater 200 to move in the axial direction along the axis SC.

The sleeve 222 is connected to the ceramic heater 200 through the outer tube 220. A rear-end-side end portion of the sleeve 222 is joined to a diaphragm 255. The movement of the ceramic heater 200 in the axial direction is transmitted to the diaphragm 255 through the sleeve 222. The diaphragm 255 deforms in accordance with the movement of the ceramic heater 200 transmitted through the sleeve 222.

A pressure sensor 260 is disposed on the diaphragm 255. The pressure sensor 260 is composed of a piezo element. When the ceramic heater 200 moves in the axial direction due to the cylinder pressure of the engine 10, the diaphragm 255 deforms, and the resistance of the piezo element, which is the pressure sensor 260, changes. The glow plug 32 converts the change in the resistance of the piezo element to an electrical signal, and outputs the electrical signal. This electrical signal is a signal corresponding to the cylinder pressure of the engine 10. In this manner, the glow plug 32 functions as a cylinder pressure sensor.

Figure 3:
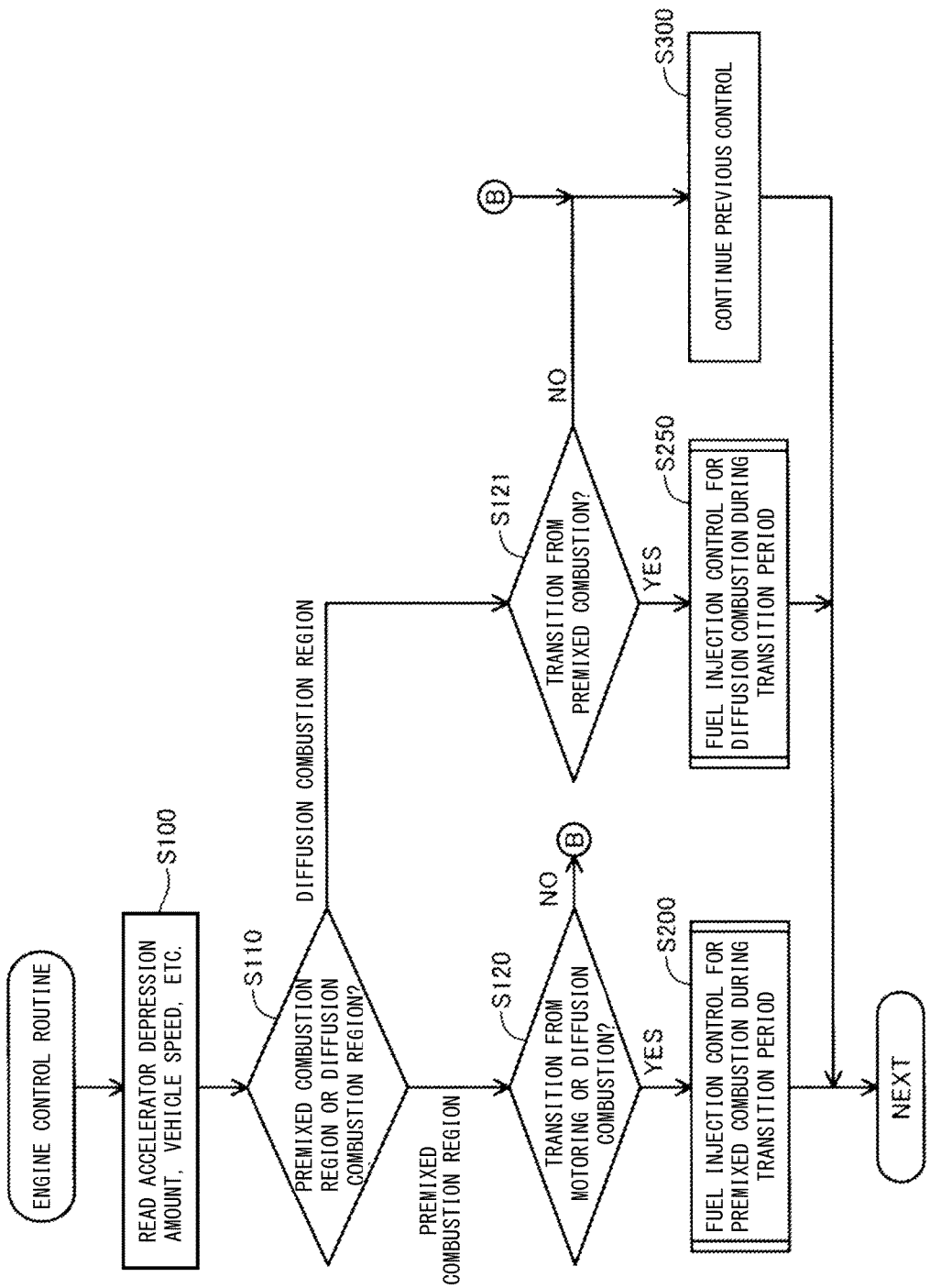
FIG. 3 is a flowchart showing an engine control routine.

(2) Engine Control Routine:

FIG. 3 is a flowchart showing an engine control routine executed by the control apparatus 100. When operation of the engine 10 is started, the ECU 70 repeatedly executes the processing shown in FIG. 3. The ECU 70 first receives signals from the sensors such as the accelerator sensor 61 and the vehicle speed sensor 64, and reads the accelerator depression amount $\alpha$, the vehicle speed V, etc., as parameters representing the load of the engine 10 (step S100).

Subsequently, the ECU 70 determines the combustion mode in accordance with the load of the engine 10 (step S110). In general, the premixed combustion mode is selected in a low-speed/low-load region within which the load of the engine is low, and the diffusion combustion mode is selected in a high-speed/high-load region within which the load of the engine is high. In step S110, the ECU 70 determines, based on the parameters obtained in step S100 (the accelerator depression amount $\alpha$ and the vehicle speed V), whether the engine load falls within a region within which the engine 10 is to be operated in the premixed combustion mode or a region within which the engine 10 is to be operated in the diffusion combustion mode.

Figure 4:
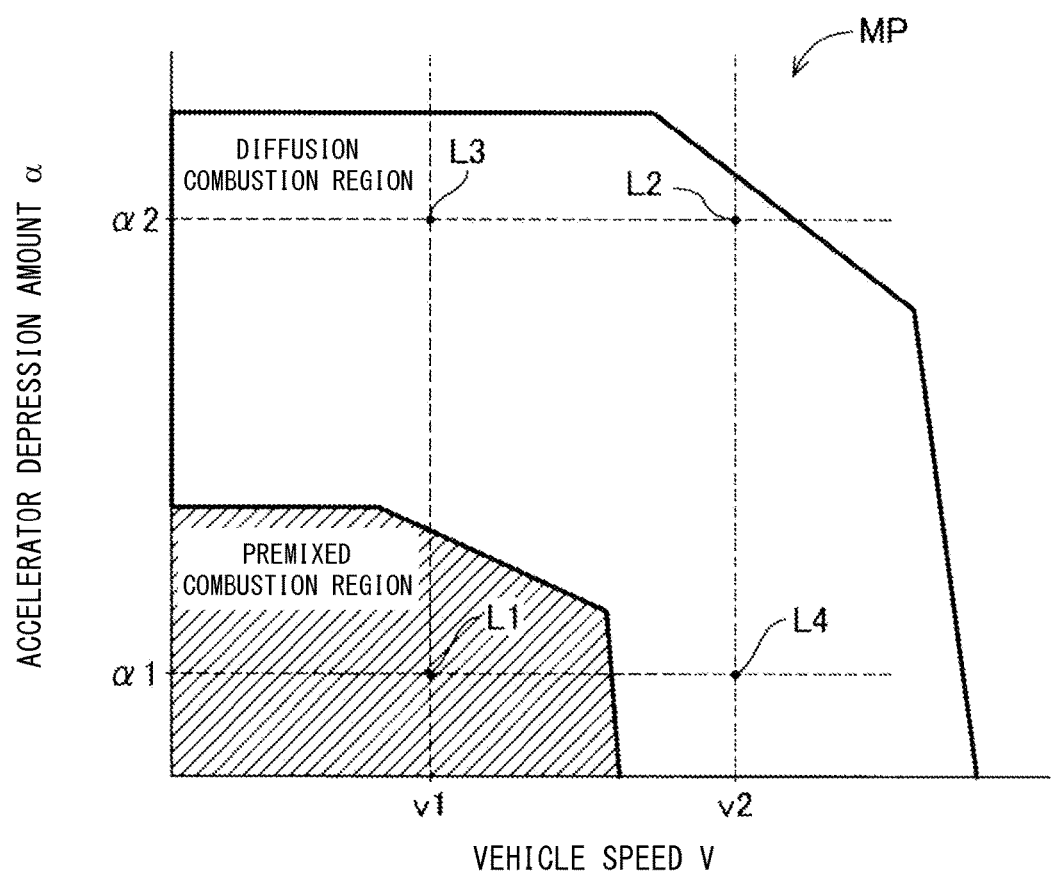
FIG. 4 is a schematic illustration showing a map used for determining the combustion mode.

FIG. 4 is a schematic illustration showing an example of a map used for determining the combustion mode in step S110. In the present embodiment, a map MP used for determining the combustion mode is a two-dimensional map of the accelerator depression amount $\alpha$ and the vehicle speed V. The map MP is prepared in advance based on the results of an experiment or the like, and is stored in the ROM 72.

According to the map MP, when both the values of the vehicle speed V and the accelerator depression amount $\alpha$ are small, the engine load is judged to fall within a premixed combustion region within which the engine 10 is to be operated in the premixed combustion mode. When at least one of the values of the vehicle speed V and the accelerator depression amount $\alpha$ is large, the engine load is judged to fall within a diffusion combustion region within which the engine 10 is to be operated in the diffusion combustion mode. For example, in the case where both the values of the vehicle speed V and the accelerator depression amount $\alpha$ are small (v1, $\alpha$1), the engine load is judged to fall within the premixed combustion region (point L1). In contrast, in the case where both the values of the vehicle speed V and the accelerator depression amount $\alpha$ are large (v2, $\alpha$2), the engine load is judged to fall within the diffusion combustion region (point L2).

In the case where the value of the vehicle speed V is small (v1) and the value of the accelerator depression amount $\alpha$ is large ($\alpha$2) (point L3) and in the case where the value of the vehicle speed V is large (v2) and the value of the accelerator depression amount $\alpha$ is small ($\alpha$1) (point L4), the engine load is judged to fall within the diffusion combustion region. Notably, the output of the engine 10 corresponding to the load thereof can be considered as the product of the output torque T and the rotational speed N of the engine 10. In place of the two-dimensional map of the vehicle speed V and the accelerator depression amount $\alpha$, a two-dimensional map of the torque T and the rotational speed N may be used as the map MP in step S110.

In the case where the ECU 70 judges in step S110 (FIG. 3) that the engine load falls within the region within which the engine 10 is to be operated in the premixed combustion mode, the ECU 70 judges whether or not the present point in time is in a transition period of switching the combustion mode from a motoring state or the region in which the engine is operated in the diffusion combustion mode (step S120). Namely, the ECU 70 judges whether or not the engine 10 is in a state of transition from a motoring state or a state in which it is operated in the diffusion combustion mode to operation in the premixed combustion mode, or is in a state immediately after the transition. In the case where the ECU 70 judges that the present point in time is in the transition period of switching to premixed combustion (step S120: "YES"), the ECU 70 performs fuel injection control for premixed combustion during transition periods, which corresponds to transition period control (step S200). This control will be described in detail below.

Meanwhile, when the ECU 70 judges in step S110 that the engine load falls within the region within which the engine 10 is to be operated in the diffusion combustion mode, the ECU 70 judges whether or not the present point in time is in a transition period of switching the combustion mode from the region in which the engine is operated in the premixed combustion mode (step S121). Namely, the ECU 70 judges whether or not the engine 10 is in a state of transition from a state in which it is operated in the premixed combustion mode to operation in the diffusion combustion mode, or is in a state immediately after the transition. In the case where the ECU 70 judges that the present point in time is in the transition period of switching to diffusion combustion (step S121: "YES"), the ECU 70 performs fuel injection control for diffusion combustion during transition periods, which corresponds to the transition period control (step S250). This control will be described in detail below.

Even in the case where the load of the engine 10 is in the region for operation in the premixed combustion mode or in the region for operation in the diffusion combustion mode, if the present point in time is not in the above-descried transition period of switching of the combustion mode (step S120, S121: "NO"), the ECU 70 continues the previous control (step S300). The expression "previous control" means the control of the engine 10 which has been performed up to that time. Accordingly, in the case where the fuel injection control in the premixed combustion mode or the diffusion combustion mode has been executed, that fuel injection control is continued. Notably, the control apparatus 100 may perform not only the fuel injection control, which will be described below, but also conventionally known various engine controls.

Figure 5:
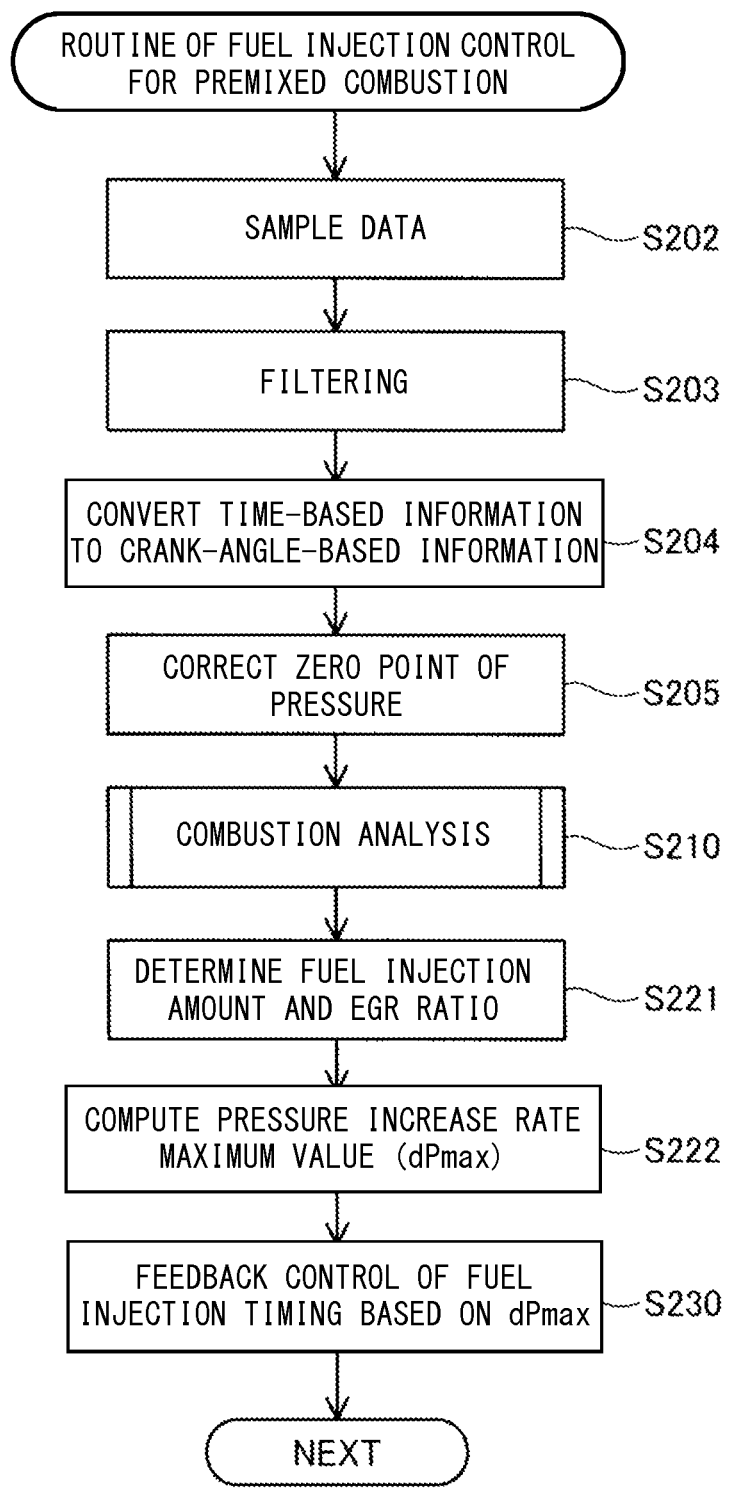
FIG. 5 is a flowchart showing a routine of fuel injection control for premixed combustion during transition periods.

(3) Fuel Injection Control for Premixed Combustion During Transition Periods:

FIG. 5 is a flowchart showing a routine of fuel injection control for premixed combustion during transition periods which is performed in step S200. When this routine is started, the ECU 70 performs sampling of data which is output from the glow plug 32 and represents the cylinder pressure (step S202). The glow plug 32 is provided for each cylinder of the engine 10, and the data obtained for each cylinder and representing the cylinder pressure is read through the input port 75 at predetermined intervals.

In step S202, the ECU 70 reads a sequence of data of the cylinder pressure sampled, at the predetermined intervals, for a cylinder in which the combustion stroke has been completed. Next, the ECU 70 performs filtering for the read sequence of data (step S203). Specifically, the filtering is low-pass filtering for removing high frequency components (specifically, noise) contained in the data of the cylinder pressure. The low-pass filtering can be realized by processing which includes obtaining a simple average or moving average of a plurality of successive data sets, or by processing which includes integrating the data in a predetermined period of time. Notably, frequency processing by fast Fourier transformation may be performed as filter processing.

Since the sampled data are the data obtained at the predetermined intervals, the data is read on the time axis. Therefore, the ECU 70 performs processing which includes converting the data to data which shows changes in the cylinder pressure with the crank angle, by using the crank angle CA obtained from the rotational angle sensor 54 (step S204). Therefore, processing after this point is performed based on the crank angle CA.

Next, the ECU 70 performs zero point correction for pressure using the cylinder pressure data obtained based on the electrical signal from the glow plug 32 (step S205). The electrical signal output from the glow plug 32 and representing the cylinder pressure contains errors such as so-called zero point drift. In view of the above, correction is performed on the data representing the cylinder pressure so that the pressure when the piston is located at the bottom dead center (BDC) is used as a reference value (zero point). As a result of this processing, noise and errors (e.g., zero point drift) contained in the signal are removed.

Subsequently, the ECU 70 performs processing for combustion analysis (step S210). In this processing, the ECU 70 analyzes the combustion state required to obtain at least the maximum value of the pressure increase rate of the cylinder pressure. Notably, in the combustion analysis (step S210), the ECU 70 may obtain various parameters relating to combustion in addition to the maximum value dPmax of the pressure increase rate of the cylinder pressure which will be described below. For example, the ECU 70 may obtain a mass fraction of burned fuel (hereinafter referred to as "mass fraction burned) (MFB) which will be described in a second embodiment or a parameter for obtaining the mass fraction burned.

Subsequently, the ECU 70 performs processing for determining a target value of the fuel injection amount and a target value of the EGR ratio (step S221). The target value q of the fuel injection amount (hereinafter referred to as the "fuel injection amount q") is obtained based on the required output of the engine. In the present embodiment, the fuel injection amount q is determined based on the negative pressure of the intake pipe, the accelerator depression amount α, the vehicle speed V, etc. Since the method of obtaining the fuel injection amount q is well known, its description is omitted here.

The EGR ratio is the ratio of exhaust recirculation performed in premixed combustion; i.e., the ratio of exhaust gas to intake gas. The EGR ratio is controlled by changing the openings of the first EGR valve 37, the second EGR valve 22, and the inter cooler passage throttle valve 18. When the combustion mode is switched from the diffusion combustion mode to the premixed combustion mode, the target value of the EGR ratio is increased to, for example, a value as high as about 80%, within a relatively short period of time, from a target value (for example, about 25%) in the diffusion combustion mode.

In step S221, the ECU 70 calculates the amount of oxygen required in a single combustion cycle of the engine from the required torque, fuel injection amount, etc., in the premixed combustion mode, and obtains the maximum value of the EGR ratio which can secure a sufficient amount of oxygen and which can suppress the generation of soot, from a map or the like. After obtaining the fuel injection amount q and the target value of the EGR ratio in this manner, the ECU 70 performs processing for computing, based on the data of the cylinder pressure, the pressure increase rate maximum value dPmax, which is the maximum value of the pressure increase rate of the cylinder pressure in each combustion cycle of a single cylinder (step S222). The pressure increase rate is not the absolute value of the pressure, but is the ratio of pressure increase per unit crank angle CA. In general, the pressure increase rate assumes the largest value; i.e., the maximum value dPmax, at the beginning of the combustion stroke. The pressure increase rate maximum value dPmax corresponds to the parameter related to changes in the cylinder pressure. Notably, in the present specification, the term "related" also means that the parameter has a certain correlation with a change in the cylinder pressure.

Next, the ECU 70 performs feedback control of fuel injection timing based on the pressure increase rate maximum value dPmax (step S230). The control is feedback control. However, combustion in the engine 10 is not a continuous phenomenon, but is a discrete phenomenon. Namely, combustion is one of four strokes (i.e., intake, compression, combustion, and exhaust) performed for each cylinder. Therefore, the feedback control is performed to determine the fuel injection timing in the next combustion cycle. The feedback control of fuel injection timing is performed as follows.

Figure 6:
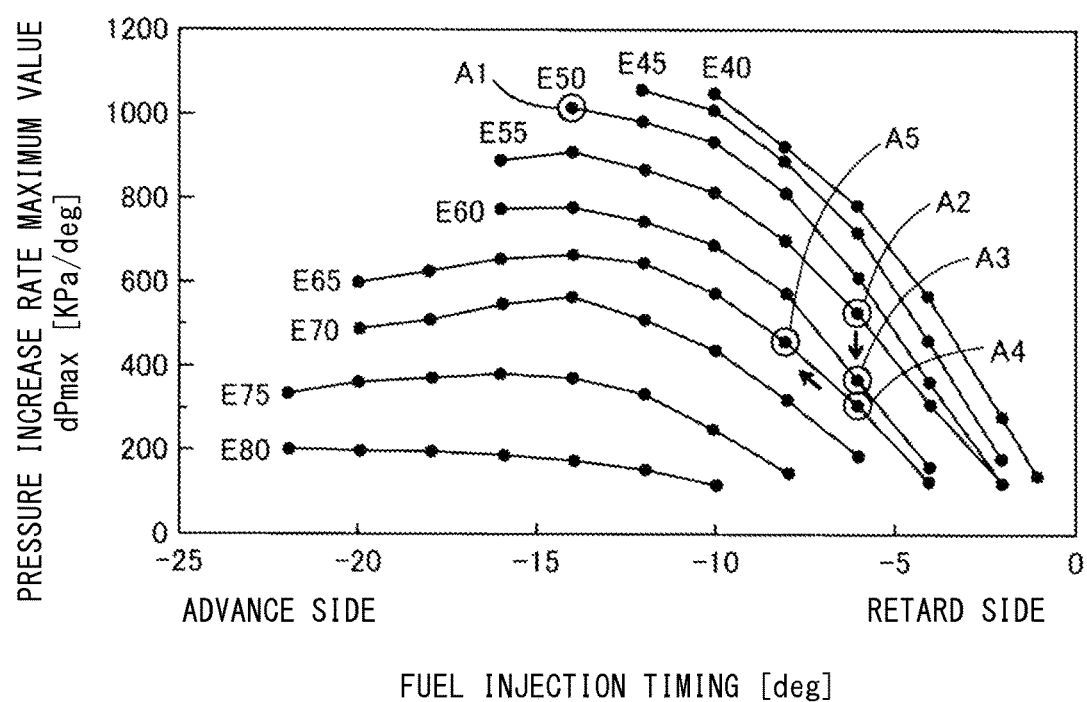
FIG. 6 is an explanatory graph which describes feedback control of fuel injection timing based on the pressure increase rate maximum value at the time of premixed combustion.

FIG. 6 is an explanatory graph which describes feedback control of fuel injection timing in the premixed combustion mode. FIG. 6 shows an example of a graph showing the relation between the fuel injection timing and the pressure increase rate maximum value dPmax for different values of the EGR ratio. In FIG. 6, for example, a curve labeled "E50" shows the relation in the case where the EGR ratio is 50%. This graph shows the results of a test in which the pressure increase rate maximum value dPmax was obtained while the fuel injection timing was changed little by little with the EGR ratio fixed. Notably, in the example of FIG. 6, since the data were obtained through measurements while the EGR ratio was changed by 5% at a time, the combustion points are also shown discretely. In actual combustion, the EGR ratio, the pressure increase rate maximum value dPmax, the fuel injection timing, etc., assume continuous values, and the combustion points are not limited to those on the control lines which are shown in FIG. 6 and which differ in the EGR ratio.

In the example of FIG. 6, in the case where the EGR ratio is low (55% or less), the greater the angle by which the fuel injection timing is retarded (the greater the degree to which the fuel injection timing approaches TDC), the smaller the pressure increase rate maximum value dPmax. Also, irrespective of the EGR ratio, when the fuel injection timing is advanced, the pressure increase rate maximum value dPmax first increases to depict an upwardly convex curve and then converges. The lower the EGR ratio, the greater the change of the pressure increase rate maximum value dPmax with the amount of advancement of the fuel injection timing. Also, the lower the EGR ratio, the greater the degree to which the point of convergence of change in the pressure increase rate maximum value dPmax shifts toward the retard side.

In step S230, from the fuel injection timing and the pressure increase rate maximum value dPmax for the cylinder in which the combustion cycle has been just completed, the ECU 70 estimates the current EGR ratio in accordance with a map in which a relation corresponding to the relation represented by the graph of FIG. 6 is set. Subsequently, the ECU 70 obtains a fuel injection timing which makes the pressure increase rate maximum value dPmax in the next combustion cycle fall within a target range. This target range is determined in advance based on the results of an experiment or the like. For example, in the case where the target range of the pressure increase rate maximum value dPmax is about 300 to 500 [kPa/deg], the fuel injection timing is controlled as follows.

In an assumed case where the fuel injection timing in the premixed combustion mode in the cylinder in which the combustion cycle has been just completed was −14 [deg], and the pressure increase rate maximum value dPmax was 1000 [kPa/deg] (combustion point A1), the EGR ratio is estimated to be about 50%. Therefore, in order to control the pressure increase rate maximum value dPmax to a value close to 500 [kPa/deg] in the next combustion cycle, the fuel injection timing is set to about −6 [deg] in consideration of an increase in the EGR ratio as well (combustion point A2).

When the combustion cycle is repeated with the fuel injection timing controlled toward the retard side at the beginning of a transition to the premixed combustion mode because the pressure increase rate maximum value dPmax is higher than a target range, the EGR ratio increases gradually, and the pressure increase rate maximum value dPmax decreases gradually. Therefore, when the combustion cycle is repeated with the fuel injection timing maintained at −6 [deg], the EGR ratio increases, and the pressure increase rate maximum value dPmax decreases (combustion point A2→A3→A4).

When the EGR ratio increases to about 70%, the pressure increase rate maximum value dPmax becomes equal to or less than 200 [kPa/deg], and the pressure increase rate maximum value dPmax becomes lower than the lower limit of the target range. Therefore, this time, the pressure increase rate maximum value dPmax is increased by advancing the fuel injection timing (combustion point A4→A5). This is the feedback control of fuel injection timing based on the pressure increase rate maximum value dPmax shown as step S230.

Figure 7A:
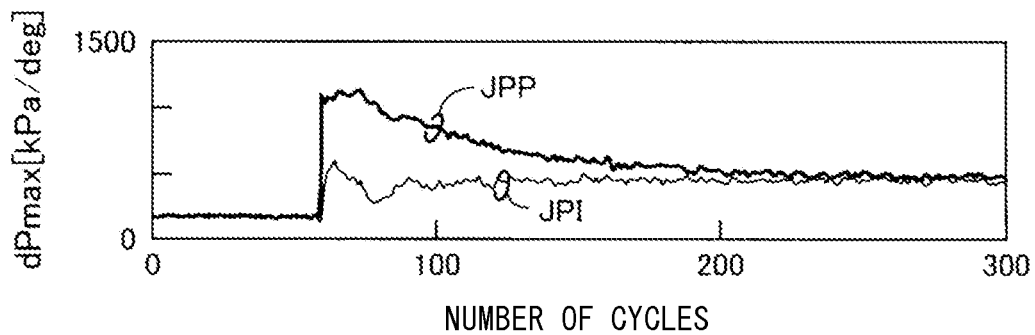
FIGS. 7(A) through 7(C) are explanatory graphs which describe the effect of fuel injection control for premixed combustion during transition periods.
Figure 7B:
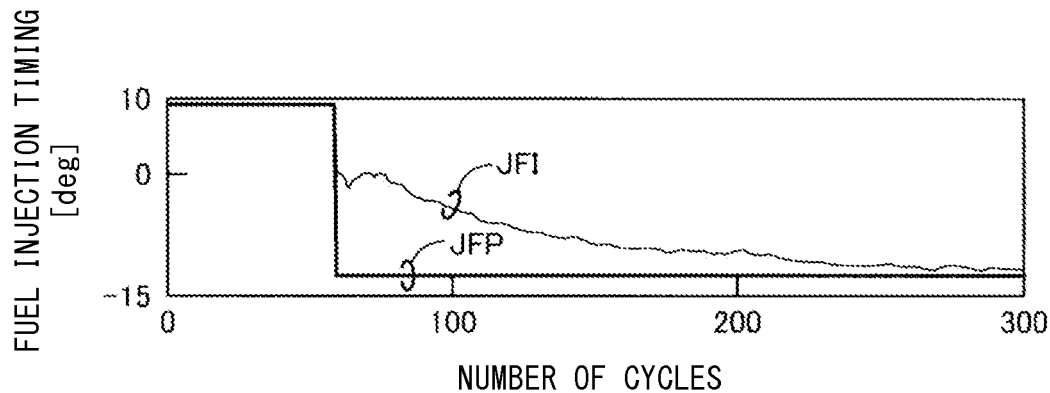
Figure 7C:
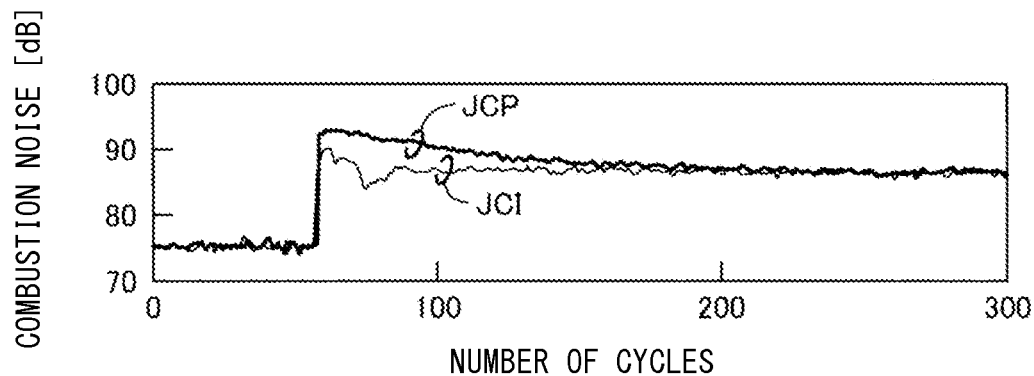

(4) Effects of Fuel Injection Control for Premixed Combustion:

The state of combustion when the above-described fuel injection timing control is performed during the transition period of switching to the premixed combustion mode will be described with reference to FIGS. 7(A) through 7(C) and FIGS. 8(A) through 8(D). FIGS. 7(A) through 7(C) are graphs which show changes in the pressure increase rate maximum value dPmax, the fuel injection timing, and the combustion noise and in which the horizontal axis shows the number of combustion cycles. FIGS. 8(A) through 8(D) are graphs which show changes in the amount of generated nitrogen oxide (NOx), the opacity representing the amount of generated soot, the exhaust recirculation ratio (EGR ratio), and the intake oxygen concentration, and in which the horizontal axis shows the elapse of time.

The graphs of FIGS. 7(A) through 7(C) and FIGS. 8(A) through 8(D) exemplify the case where the combustion mode was switched from the diffusion combustion mode to the premixed combustion mode at a timing near 50 cycles. The combustion noise was measured using an external noise meter. The amount of NOx was measured using the NOx sensor 59, and the opacity was measured using the opacity sensor 57. The EGR ratio was computed from the oxygen concentration measured using the oxygen concentration sensor 53. Since these sensors are disposed at different locations on the intake-exhaust system 20, the sensors differ from one another in terms of the number of cycles or time between a point in time when the combustion mode is switched to the premixed combustion mode and a point in time when the influence of the switching appears on the output signal. In FIGS. 7(A) through 7(C) and FIGS. 8(A) through 8(D), such differences are corrected. In FIGS. 7(A) through 7(C) and FIGS. 8(A) through 8(D), continuous lines JPI, JFI, JCI, JNI, JOT, JEI, and JI denoted by symbols whose final letter is "I" show the data for the case where the fuel injection timing was feedback-controlled such that the pressure increase rate maximum value dPmax fell within the target range. Meanwhile, continuous lines JPP, JFP, JCP, JNP, JOP, JEP, and JP denoted by symbols whose final letter is "P" show the data for the case where the feedback control of fuel injection timing based on the pressure increase rate maximum value dPmax was not performed.

In the case where the feedback control of fuel injection timing was not performed, the fuel injection timing was fixed to −14 [deg] with respect to TDC immediately after the timing of 50 cycles at which the combustion mode was switched from the diffusion combustion mode to the premixed combustion mode (continuous line JFP in FIG. 7(B)). In contrast, in the case where the feedback control of fuel injection timing based on the pressure increase rate maximum value dPmax was performed, the fuel injection timing was controlled such that the advancement angle gradually increased (continuous JFI).

Figure 8A:
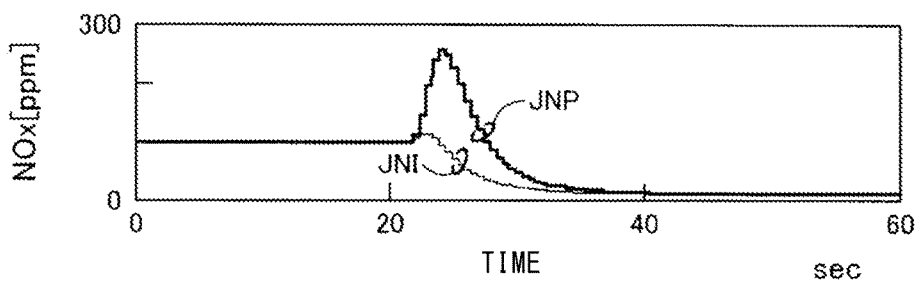
FIGS. 8(A) through 8(D) are explanatory graphs which describe the effect of the fuel injection control for premixed combustion during transition periods.
Figure 8B:
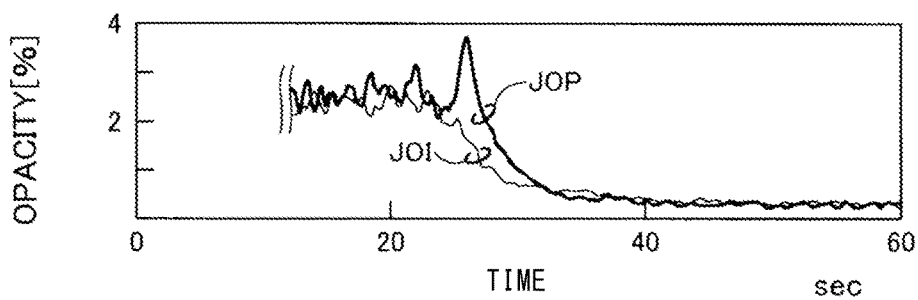
Figure 8C:
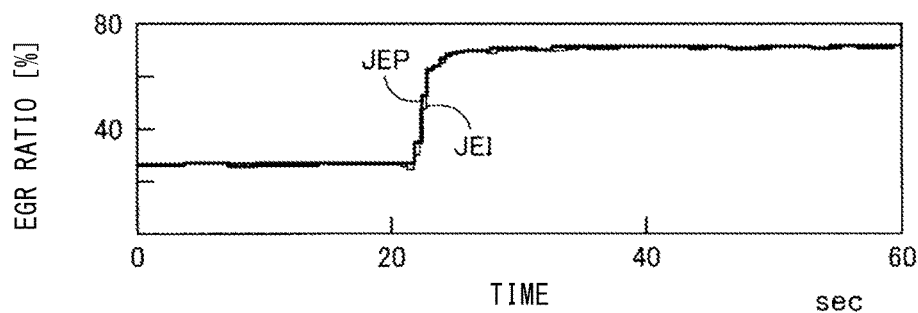
Figure 8D:
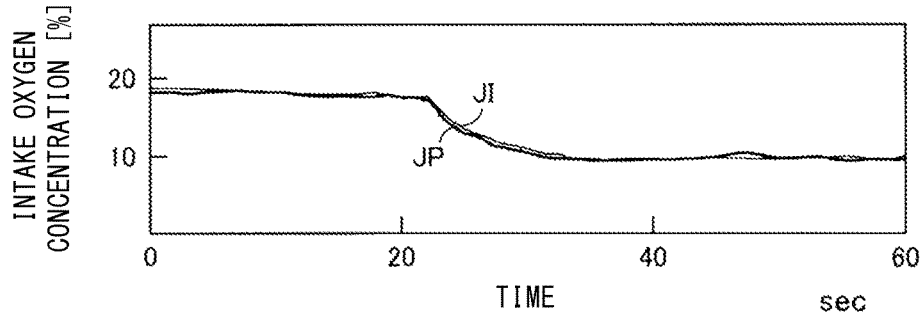

When the combustion mode was switched to the premixed combustion mode, the EGR ratio (FIG. 8(C)) changed from about 25% to about 70% within a short period of time (continuous lines JEI, JEP). Notably, as described above, an increase in the EGR ratio immediately after switching to the premixed combustion mode occurs because the openings of the first EGR valve 37, the second EGR valve 22, and the inter cooler passage throttle valve 18 have been changed. The EGR ratio gradually increases as a result of switching of each valve. A predetermined time (at least several seconds) is necessary for the EGR ratio to reach 70%. Further, since the amount of oxygen remaining in the exhaust gas decreases as a result of recirculating the exhaust gas, the intake oxygen concentration decreases mildly as compared with a change in the EGR ratio. The final EGR ratio in the premixed combustion mode is, for example, about 80%.

In the case where feedback control of fuel injection timing was performed, the combustion noise (FIG. 7(C)) during the transition period immediately after switching to the premixed combustion mode was about 10 [dB] lower than that in the case where the feedback control of fuel injection timing was not performed. Also, in the case where the feedback control of fuel injection timing was performed, the amount of generated NOx did not increase remarkably after the switching to the premixed combustion mode, and was reduced over about 10 seconds or longer (FIG. 8(A)).

The opacity was also improved, and the amount of generated soot was reduced (FIG. 8(B)). Notably, a decrease in torque was not observed even when the feedback control of fuel injection timing based on the pressure increase rate maximum value dPmax was performed. As described above, the state of combustion in the engine 10 was improved as a result of feedback control of fuel injection timing based on the pressure increase rate maximum value dPmax during the transition period after switching to the premixed combustion mode.

Figure 9:
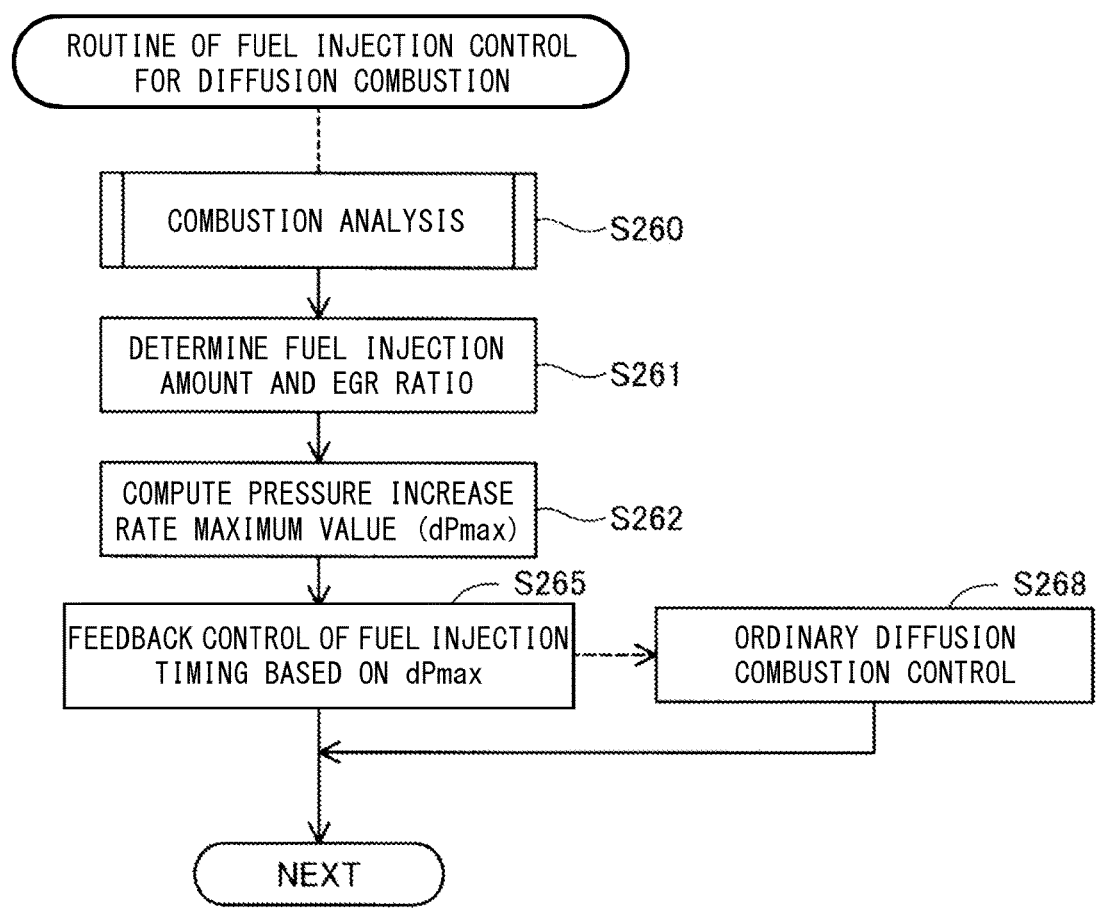
FIG. 9 is a flowchart showing a fuel injection control routine for diffusion combustion.

(5) Fuel Injection Control for Diffusion Combustion During Transition Periods:

FIG. 9 is a flowchart showing a routine of fuel injection control for diffusion combustion during transition periods which is performed in step 250 (FIG. 3). When this routine is started, the ECU 70 performs cylinder pressure data processing (not shown), like steps S202 through S205 of FIG. 5, before proceeding to step S260. In step S260, the ECU 70 performs combustion analysis processing by the same method as that used in step S210 of FIG. 5.

In step S261, the ECU 70 performs processing for determining the fuel injection amount q and the target value of the EGR ratio within the region for operation in the diffusion combustion mode based on the required output of the engine. In this processing, by using the same parameters as those used in step S221 when the engine is operated in the premixed combustion mode, the fuel injection amount q and the target value of the EGR ratio suitable for the diffusion combustion mode are obtained from a map and computation processing which differ from those used when the engine is operated in the premixed combustion mode. In step S262, the ECU 70 calculates the maximum value dPmax of the pressure increase rate. The processing in step S262 is substantially the same as the processing in step S222 of FIG. 5.

Figure 10:
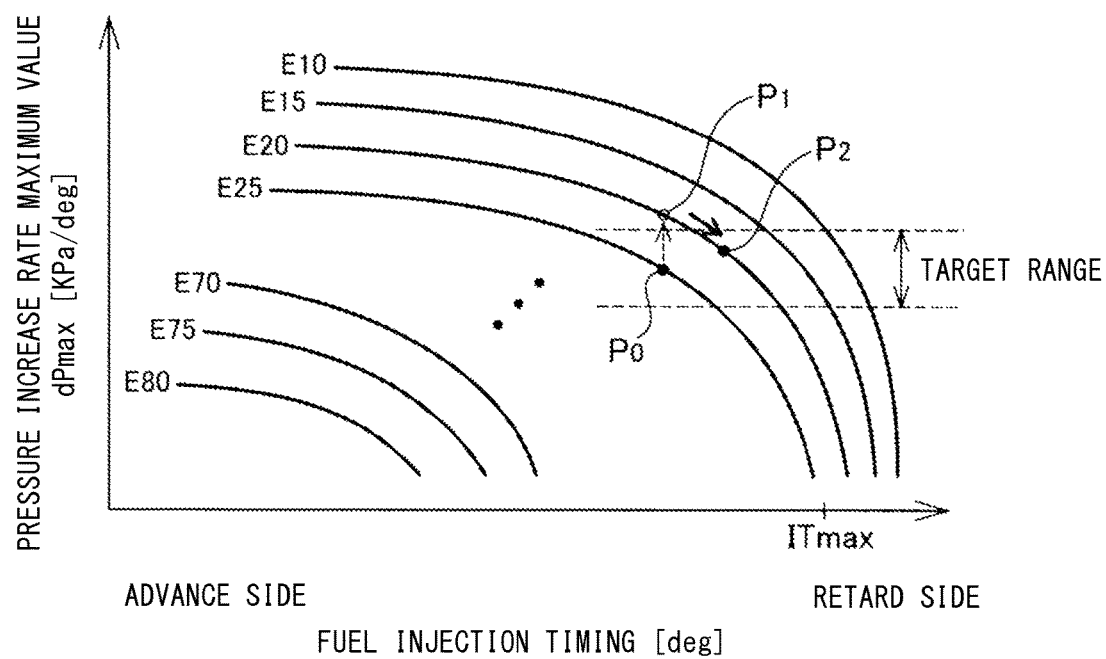
FIG. 10 is an explanatory graph which describes feedback control of fuel injection timing based on a pressure increase rate maximum value at the time of diffusion combustion.

FIG. 10 is an explanatory graph used for describing the feedback control of fuel injection timing in the diffusion combustion mode in step S265. FIG. 10 shows an example of a graph showing the relation between the fuel injection timing and the pressure increase rate maximum value dPmax for different values of the EGR ratio. The graph of FIG. 10 is obtained by the same method as that used for obtaining the graph of FIG. 6. In FIG. 10, the EGR ratio is denoted in the same manner as in the case of FIG. 6.

In the graph of FIG. 10, irrespective of the EGR ratio, when the fuel injection timing is advanced, the pressure increase rate maximum value dPmax first increases to depict an upwardly convex curve and then converges. The lower the EGR ratio, the greater the degree of the above-described trend. Also, in this example, irrespective of the EGR ratio, the pressure increase rate maximum value dPmax converges to a certain value on the retarded side of the fuel injection timing. The lower the EGR ratio, the greater the degree to which the fuel injection timing at which the pressure increase rate maximum value dPmax converges shifts toward the retarded side.

The ECU 70 stores a map corresponding to the graph of FIG. 10 in the ROM 72. In step S265, from the fuel injection timing and the pressure increase rate maximum value dPmax for the cylinder in which the combustion cycle has been just completed, the ECU 70 estimates the current EGR ratio using the map. Subsequently, the ECU 70 obtains a fuel injection timing which makes the pressure increase rate maximum value dPmax in the next combustion cycle fall within the target range. This target range is determined based on the results of an experiment or the like. In step S265, for example, the fuel injection timing is controlled as follows.

Immediately after switching from the premixed combustion mode, the fuel injection timing is controlled such that the intake oxygen concentration sharply increases or the EGR ratio sharply decreases. Since combustion is promoted in the diffusion combustion mode, the EGR decreases gradually, and the pressure increase rate maximum value dPmax increases and may deviate from the target range (point $P_0 \rightarrow$ point $P_1$). Therefore, in the case where there is a possibility that the pressure increase rate maximum value dPmax exceeds a predetermined upper limit value, the fuel injection timing is controlled toward the retarded side such that the pressure increase rate maximum value dPmax decreases (point $P_1 \rightarrow$ point $P_2$).

Even in the feedback control of fuel injection timing based on the pressure increase rate maximum value dPmax in the diffusion combustion mode, effects can be obtained similar to those which are obtained when the combustion mode is the premixed combustion mode and which have been described with reference to FIGS. 7(A) through 7(C) and FIGS. 8(A) through 8(D). Accordingly, combustion noise is reduced, and generation of NOx and soot is suppressed.

As shown in the graph of FIG. 10, when the fuel injection timing is controlled toward the retarded side as the EGR ratio decreases, the change of the fuel injection timing with a change of the pressure increase rate maximum value dPmax becomes small, and finally converges. In view of the above, when the fuel injection timing reaches a predetermined value ITmax indicating the convergence on the retarded side, in S265, the ECU 70 determines that the transition period of switching has ended, and proceeds to fuel injection control in the ordinary diffusion combustion mode (step S268).

In step S268, the ECU 70 performs fuel injection control in which the fuel injection timing is set in accordance with parameters (for example, the load of the engine 10) other than the parameter related to change in the cylinder pressure. Since this control is well known, the details thereof will not be described herein. Various control methods for controlling the fuel injection timing in the diffusion combustion mode can be applied to the control started in step S268, and no limitation is imposed thereon. As described above, in the present embodiment, in the diffusion combustion mode, the control of the fuel injection timing is switched between that used during the transition period and that used after the end of the transition period. Accordingly, proper fuel injection control is executed corresponding to the timing (during the transition period or after the end of the transition period) in the period during which the combustion mode is the diffusion combustion mode. Therefore, the state of combustion in the diffusion combustion mode is further improved.

(6) Modifications of the Fuel Injection Control for Diffusion Combustion:

The switching from feedback control of fuel injection timing based on the pressure increase rate maximum value dPmax (step S265) to the fuel injection control in the ordinary diffusion combustion mode (step S268) can be performed by methods other than the above-described method. For example, the following Configuration examples 1 through 3 (modifications) may be applied.

Configuration Example 1

When the ECU 70 judges in step S110 that the engine load falls within the region within which the engine is to be operated in the diffusion combustion mode, prior to step S250, the ECU 70 obtains a fuel injection timing for the fuel injection control in the ordinary diffusion combustion mode performed in step S268. Specifically, the ECU 70 uses, in this stage, the map used for determining the fuel injection timing in step S268. After that, in step S265, the ECU 70 determines the fuel injection timing based on the pressure increase rate maximum value dPmax, and compares it with the previously obtained fuel injection timing for ordinary fuel injection control. In the case where the two values are equal to each other or close to each other (for example, where the difference between the two values is about ±10%), the ECU 70 determines that the transition period of switching the combustion mode has ended, and proceeds to the fuel injection control in the ordinary diffusion combustion mode without performing feedback control based on the pressure increase rate maximum value dPmax (step S268). In the case where the two values are neither equal to each other nor close to each other, the ECU 70 performs feedback control using the fuel injection timing determined based on the pressure increase rate maximum value dPmax (step S265).

Configuration Example 2

The control apparatus 100 stores in the ROM 72 a map for determining a value of the fuel injection timing, which serves as a condition for ending the feedback control of step S265, in accordance with the load state of the engine 10. In step S265, the ECU 70 obtains a value of the fuel injection timing based on the pressure increase rate maximum value dPmax, and also obtains a value of the fuel injection timing, which serves as the condition for ending the feedback control, in accordance with the load state of the engine 10. In the case where the two values are equal to each other or close to each other (for example, the difference between the two values is about ±10%), the ECU 70 proceeds to fuel injection control in the ordinary diffusion combustion mode without performing the feedback control based on the pressure increase rate maximum value dPmax (step S268). In the case where the two values are neither equal to each other nor close to each other, the ECU 70 performs the feedback control using the fuel injection timing determined based on the pressure increase rate maximum value dPmax (step S265). Notably, the map for determining the value of the fuel injection timing which serves as the condition for ending the feedback control may be the same map as the map used for determining the fuel injection timing in step S268.

Configuration Example 3

After the fuel injection timing has reached the predetermined threshold ITmax at which the fuel injection timing is judged in step S265 to have converged, the ECU 70 continues the control while maintaining that fuel injection timing for a while. Subsequently, in the case where the pressure increase rate maximum value dPmax increases and exceeds a predetermined threshold as a result of a decrease in the EGR ratio (i.e., an increase in the intake oxygen concentration), the ECU 70 proceeds to the fuel injection control in the ordinary diffusion combustion mode in step S268. Desirably, the predetermined threshold for the pressure increase rate maximum value dPmax is a value close to the lower limit value of the target range of the pressure increase rate maximum value dPmax in the feedback control performed based on the pressure increase rate maximum value dPmax in the premixed combustion mode. Specifically, in the case where the target range of the pressure increase rate maximum value dPmax in the feedback control in the premixed combustion mode is 300 to 500 [kPa/deg], the pressure increase rate maximum value dPmax which serves as the condition for ending the feedback control is set to a value close to 300 [kPa/deg]. Thus, even in the case where the combustion mode changes to the premixed combustion mode after the ECU 70 has proceeded to the fuel injection control in the ordinary diffusion combustion mode, torque fluctuation and generation of soot due to a sudden change in the EGR ratio can be suppressed.

(7) Summary of First Embodiment:

As described above, the control apparatus 100 of the first embodiment properly controls the fuel injection timing based on the pressure increase rate maximum value dPmax, which has a strong correlation with the EGR ratio or the intake oxygen concentration, during the transition period of switching the combustion mode from the premixed combustion mode to the diffusion combustion mode. Accordingly, the combustion in the engine 10 during the transition period of switching from the premixed combustion mode to the diffusion combustion mode is improved. Also, the control apparatus 100 of the first embodiment performs the fuel injection control based on the pressure increase rate maximum value dPmax during the transition period of switching to the premixed combustion mode from the diffusion combustion mode or the motoring state. Accordingly, the combustion in the engine 10 is improved not only during the transition period of switching to the diffusion combustion mode, but also during the transition period of switching to the premixed combustion mode.

B. Second Embodiment:

A control apparatus which is a second embodiment of the present invention has the same hardware configuration (FIG. 1) as that of the control apparatus 100 of the first embodiment, and controls the engine 10 by the same engine control routine as that of the engine control routine (FIG. 3) of the first embodiment. As described below, the engine control routine of the second embodiment differs from the engine control routine of the first embodiment in the details of the fuel injection control performed in step S200 during the transition period of switching to the premixed combustion mode from the motoring state or the diffusion combustion mode. Notably, since the details of the fuel injection control for diffusion combustion performed in S250 during the transition period of switching from the premixed combustion mode are the same as those in the first embodiment, a description of the fuel injection control for diffusion combustion is omitted.

Figure 11:
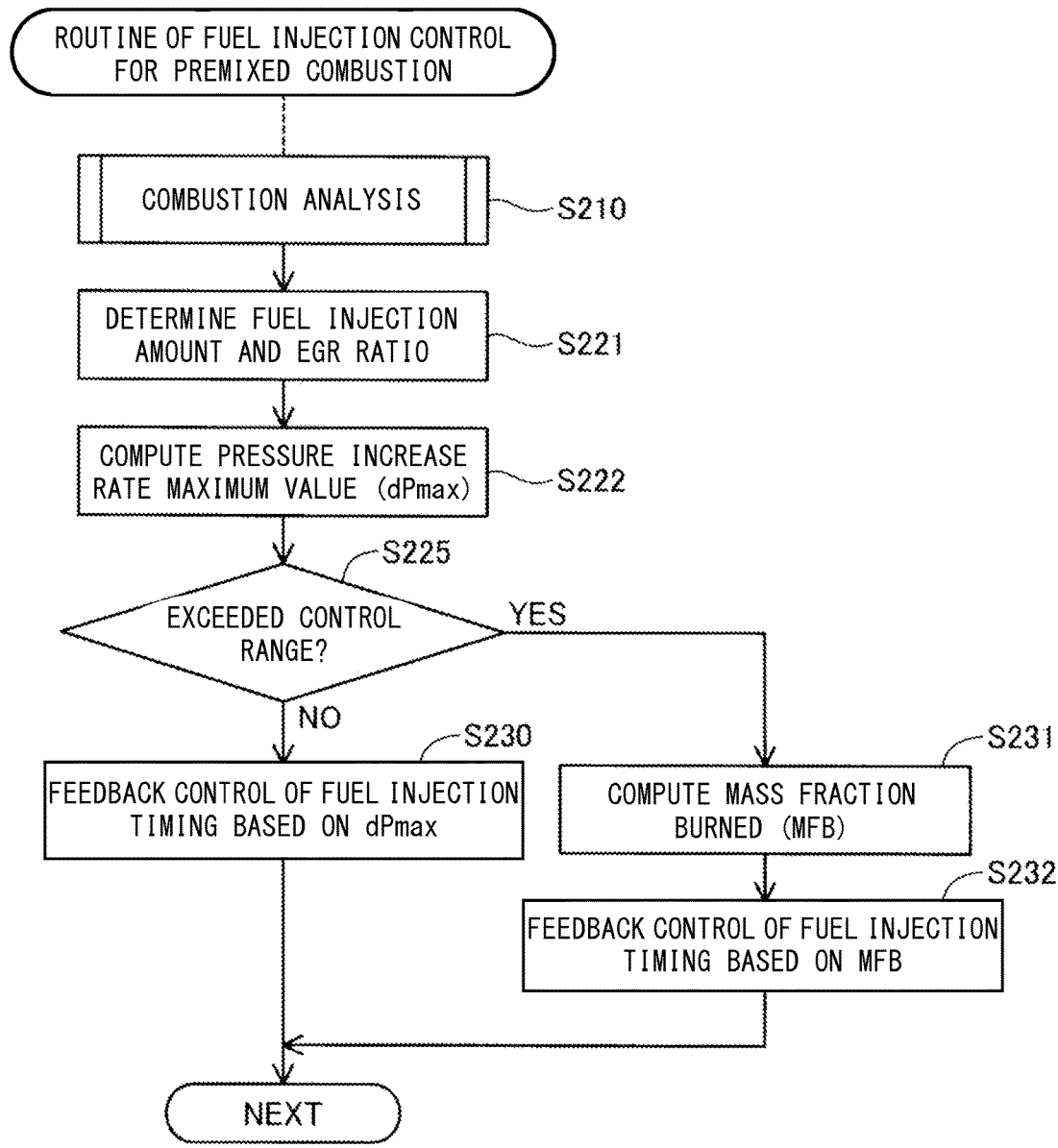
FIG. 11 is a flowchart showing a fuel injection control routine for premixed combustion in a second embodiment.

FIG. 11 is a flowchart of the routine of fuel injection control for premixed combustion according to the second embodiment which is performed during the transition period of switching from the motoring state or the diffusion combustion mode. A first half (up to step S210) of the control routine shown in FIG. 11 is omitted. When the fuel injection control for premixed combustion is started, the ECU 70 performs the same processing as that of the first embodiment (steps S210 through S222). After computing the pressure increase rate maximum value dPmax in step S222, the ECU 70 judges whether or not the pressure increase rate maximum value dPmax falls outside the range of the control based on the pressure increase rate maximum value dPmax (step S225). An example of the case where the pressure increase rate maximum value dPmax falls outside the range of the control based on the pressure increase rate maximum value dPmax is the case where the pressure increase rate maximum value dPmax is not expected to change by a desired amount as a result of the fuel injection timing control.

In the present embodiment, the pressure increase rate maximum value dPmax is judged to fall outside the control range when an increase amount of the pressure increase rate maximum value dPmax is smaller than a predetermined threshold or when a predetermined number of pressure increase rate maximum values dPmax calculated successively are close to one another (for example, fall within the range of ±10%). Notably, in step S225, the ECU 70 may judge that the pressure increase rate maximum value dPmax falls outside the control range when a pressure increase rate maximum value dPmax which is expected to result in advancing the fuel injection timing by an amount equal to or greater than a predetermined threshold is obtained in step S230. The "predetermined threshold" for the fuel injection timing is desirably set based on the range of the fuel injection timing within which the pressure increase rate maximum value dPmax converges. For example, in the graph of FIG. 6, −14 [deg] may be employed as a predetermined threshold, and the pressure increase rate maximum value dPmax may be judged to fall outside the control range when a pressure increase rate maximum value dPmax which results in advancing the fuel injection timing beyond the −14 [deg] is obtained.

In the case where the result of the judgment in step S225 is "NO," the pressure increase rate maximum value dPmax falls within the control range within which the control is performed based on the pressure increase rate maximum value dPmax. In this case, the ECU 70 performs feedback control of fuel injection timing based on the pressure increase rate maximum value dPmax in the same manner as in the first embodiment (step S230). In contrast, in the case where the result of the judgment in step S225 is "YES"; namely, in the case where the pressure increase rate maximum value dPmax is judged to fall outside the control range within which the control is performed based on the pressure increase rate maximum value dPmax, the ECU 70 performs the processing of computing the mass fraction burned MFB (step S231).

The mass fraction burned MFB corresponds to the parameter related to a change in the cylinder pressure, and represents the ratio of the heat generation Qca up to a certain crank angle ca to the maximum heat generation Qmax in a single combustion cycle. The mass fraction burned MFBca at the certain crank angle ca is represented by the following equation (A).

$$MFBca = 100 \cdot Qca/Qmax \tag{A}$$

In the second embodiment, MFB30 which is the ratio up to 30 degrees (crank angle) is used as the mass fraction burned MFB. After calculating the mass fraction burned MFB30, the ECU 70 performs feedback control of fuel injection timing based on the mass fraction burned MFB30 (step S232).

Figure 12:
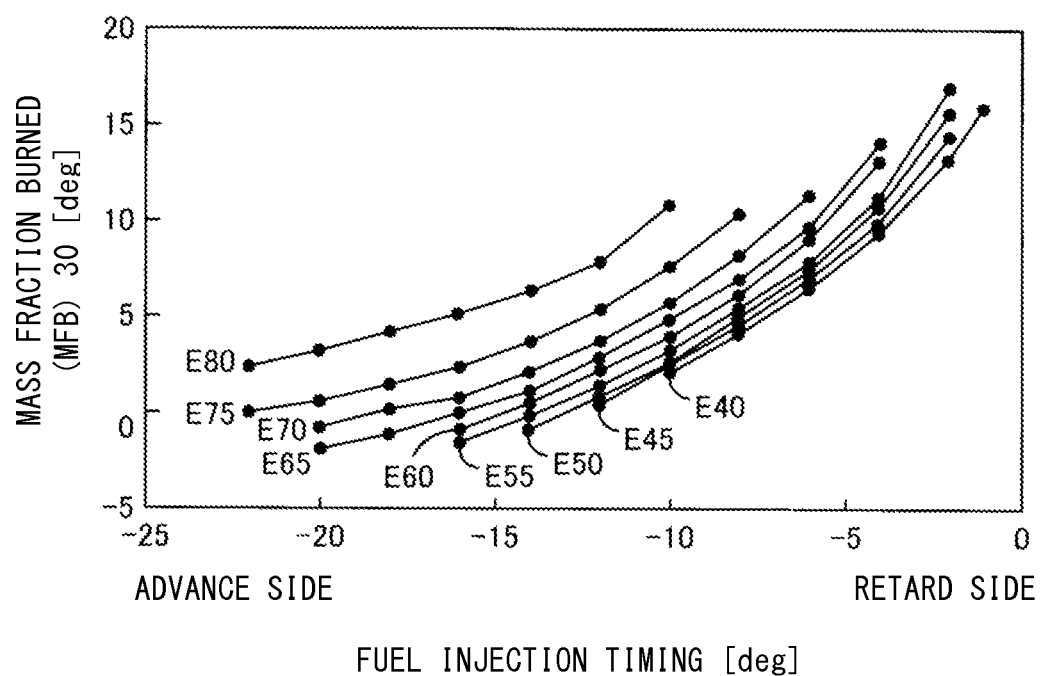
FIG. 12 is an explanatory graph which describes feedback control of fuel injection timing based on the mass fraction of burned fuel at the time of premixed combustion.

FIG. 12 is an explanatory graph used for describing the feedback control of fuel injection timing which is performed in step S232 based on the mass fraction burned MFB. FIG. 12 shows an example of a graph showing the relation between the fuel injection timing and the mass fraction burned MFB30 for different values of the EGR ratio. This graph shows that, over a wide range of the crank angle ca (−22 [deg] or greater), the mass fraction burned MFB30 monotonously increases to depict a downward convex curve when the fuel injection timing changes from the advance side toward the retarded side. This graph also shows that, even when the value of the mass fraction burned MFB30 is the same, as the EGR ratio decreases, the fuel injection timing shifts toward the retarded side.

In step S232, the ECU 70 obtains a fuel injection timing which makes the mass fraction burned MFB30 fall within a predetermined target range. As described above, in the case where the pressure increase rate maximum value dPmax falls outside the range of the control based on the pressure increase rate maximum value dPmax, the EGR ratio or the intake oxygen concentration converges to a certain value, and a change in the pressure increase rate maximum value dPmax when the fuel injection timing is controlled becomes small. Even in such a case, the mass fraction burned MFB30 has a sufficient degree of sensitivity for a change in the fuel injection timing. Accordingly, premixed combustion which is more excellent in thermal efficiency can be realized by performing feedback control of fuel injection timing by using the mass fraction burned MFB30 instead of the pressure increase rate maximum value dPmax.

Figure 13A:
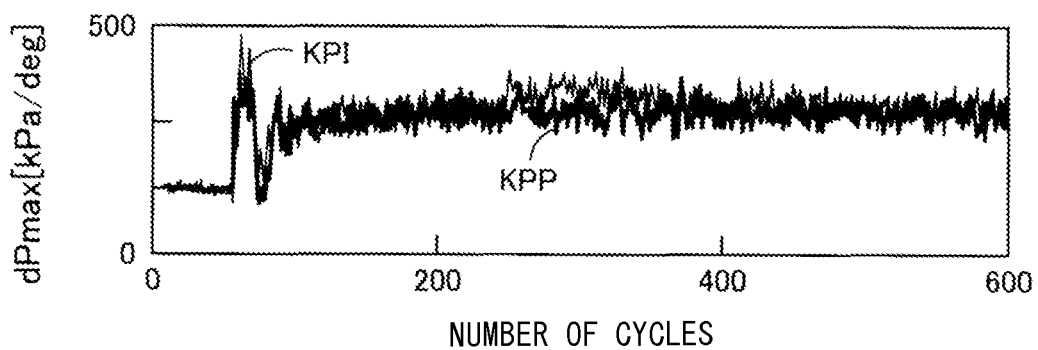
FIGS. 13(A) through 13(C) are explanatory graphs showing a control example of the fuel injection control for premixed combustion in the second embodiment.
Figure 13B:
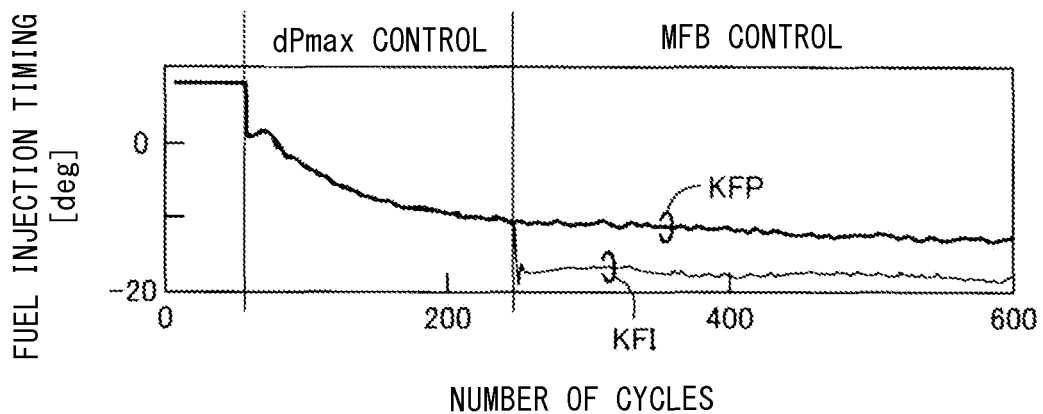
Figure 13C:
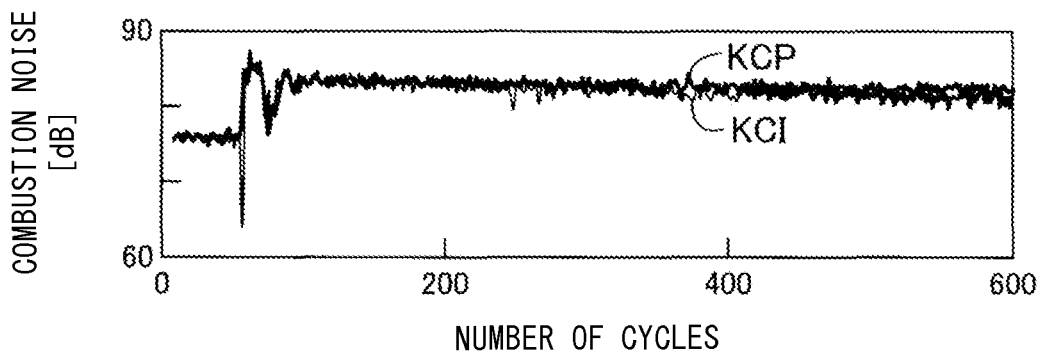
Figure 14A:
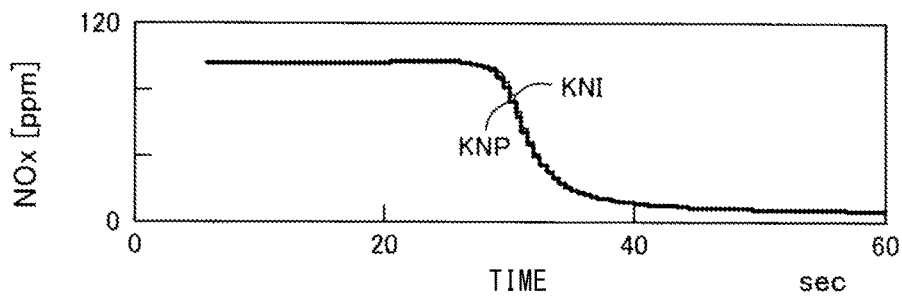
FIGS. 14(A) through 14(D) are explanatory graphs showing the control example of the fuel injection control for premixed combustion in the second embodiment.
Figure 14B:
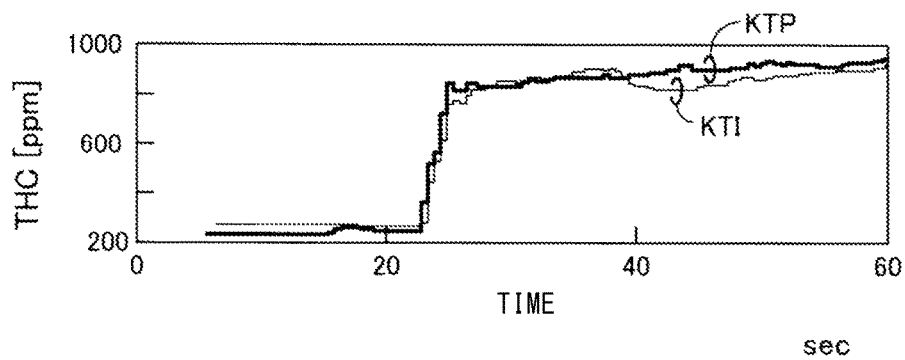
Figure 14C:
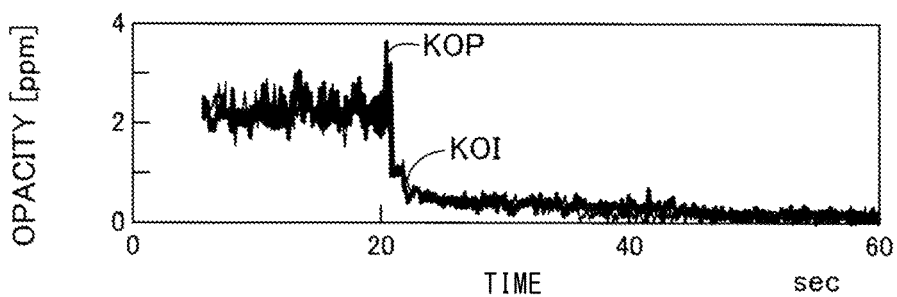
Figure 14D:
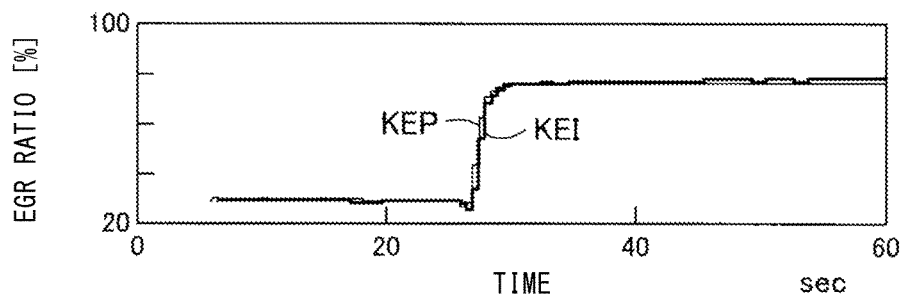

A control example of the fuel injection timing control for premixed combustion in the second embodiment will be described with reference to FIGS. 13(A) through 13(C) and FIGS. 14(A) through 14(D). FIGS. 13(A) through 13(C) are graphs which show changes in pressure increase rate maximum value dPmax, the fuel injection timing, and the combustion noise when the combustion mode is switched to the premixed combustion mode, and in which the horizontal axis shows the number of combustion cycles. FIGS. 14(A) through 14(D) are graphs which show changes in the amount of generated nitrogen oxide (NOx), THC which is the total amount of hydrocarbon, the opacity, and the EGR ratio and in which the horizontal axis shows the elapse of time. In FIGS. 13(A) through 13(C) and FIGS. 14(A) through 14(D), continuous lines KPI, KFI, KCI, KNI, KTI, KOI, and KEI denoted by symbols whose final letter is "I" show the data for the case where the control of the second embodiment was performed. Meanwhile, continuous lines KPP, KFP, KCP, KNP, KTP, KOP, and KEP denoted by symbols whose final letter is "P" show the data for the case where the control of the first embodiment was performed.

In the control of the second embodiment, the control based on the pressure increase rate maximum value dPmax was switched to control based on the mass fraction burned MFB30 at a timing near 220 cycles (FIG. 13(B)). As a result, in the control based on the mass fraction burned MFB30, as compared with the case where the control based on the pressure increase rate maximum value dPmax is continued (continuous line KFP), the fuel injection timing was controlled toward the advance side to a great degree. Also, the THC was reduced (FIG. 14(B)). Notably, regarding the combustion noise, NOx, opacity, etc., no significant difference was observed between the first embodiment and the second embodiment, and similar effects were attained.

As described above, in the fuel injection control for premixed combustion according to the second embodiment, during the transition period of switching to the premixed combustion mode, the feedback control of fuel injection timing based on the pressure increase rate maximum value dPmax is first performed. After that, when the EGR ratio increases and the pressure increase rate maximum value dPmax falls outside the control range, the feedback control of fuel injection timing based on the mass fraction burned MFB30 is started. Since the thermal efficiency is further improved by this control, in addition to the same effects as those of the first embodiment, a remarkable effect of improving THC can be attained. Also, since the fuel injection timing can be controlled toward the advance side to a greater degree as compared with the case of the first embodiment, the control range of the feedback control of fuel injection timing can be expanded.

As described above, in the case where the pressure increase rate maximum value dPmax falls outside the range of control based on the pressure increase rate maximum value dPmax during the transition period of switching to the premixed combustion mode, the control apparatus of the second embodiment performs the switching to the control based on the mass fraction burned MFB. Accordingly, during the transition period of switching to the premixed combustion mode, the controllability of the fuel injection control is enhanced. Therefore, in addition to effects similar to those of the first embodiment, an effect of further improving the state of combustion in the engine 10 can be attained.

Figure 15:
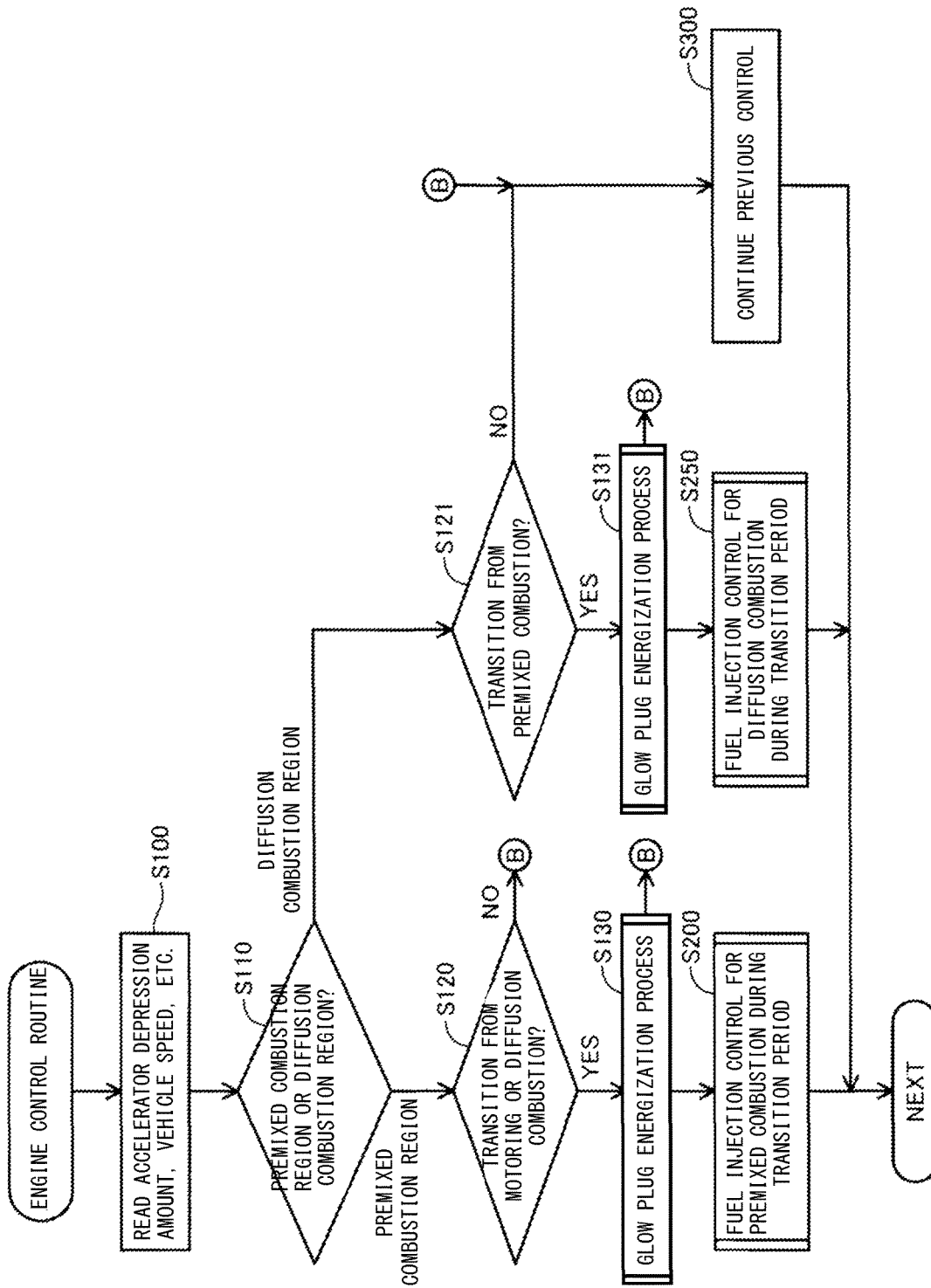
FIG. 15 is a flowchart showing an engine control routine according to a third embodiment.

C. Third Embodiment:

FIG. 15 is a flowchart of the engine control routine executed by a control apparatus which is a third embodiment of the present invention. The control apparatus of the third embodiment has substantially the same hardware configuration as the control apparatus 100 of the first embodiment (FIGS. 1 and 2). The engine control routine executed by the control apparatus of the third embodiment is substantially the same as the control routine of the first embodiment (FIG. 3), except that the process of steps S130 and S131 is added. The details of the fuel injection controls performed in steps S200 and S250 are the same as those of the first embodiment (FIGS. 5 and 9). Notably, the details of the fuel injection control performed in step S200 may be the same as those of the second embodiment (FIG. 11).

In the engine control routine of the third embodiment, the ECU 70 performs a glow plug energization process for energizing the glow plug 32 before the ECU 70 starts, in step S200 and S250, the fuel injection control during the transition period of switching the combustion mode (steps S130 and S131). As a result of performing the glow plug energization process beforehand, the cycle variation of torque of the engine 10 in the fuel injection controls performed in steps S200 and S250 during the transition period is suppressed, whereby combustion during the transition period of switching the combustion mode is improved.

Figure 16:
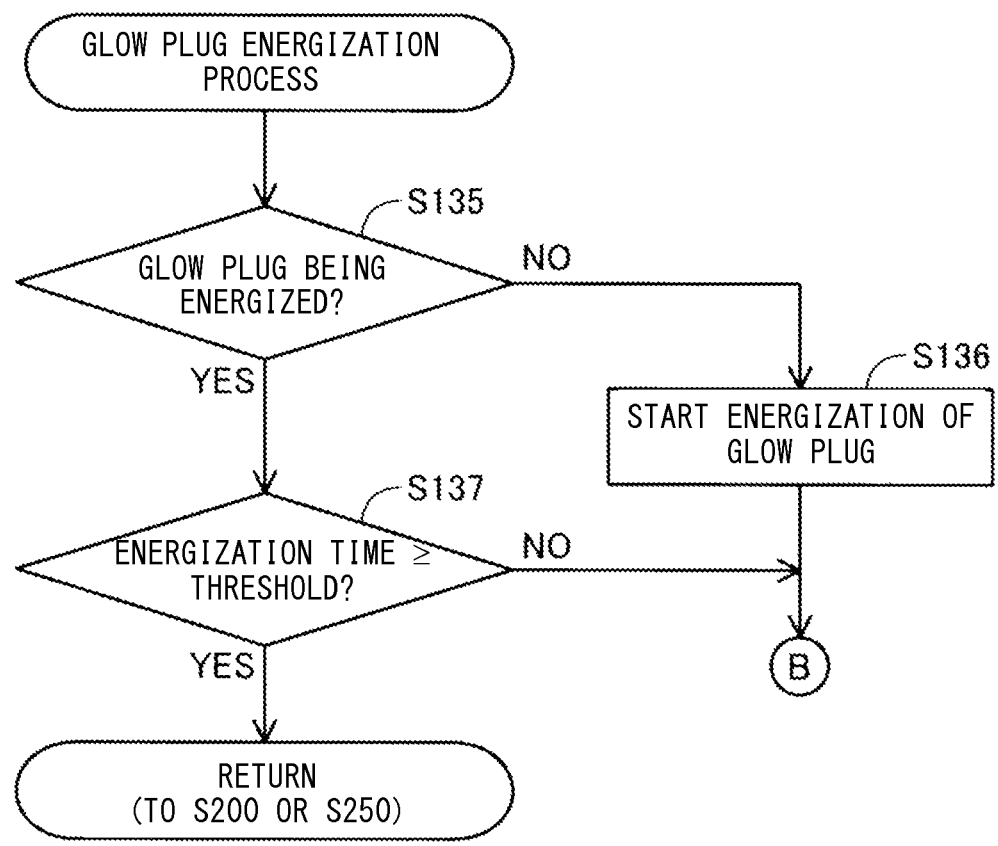
FIG. 16 is a flowchart of a glow plug energization process.

FIG. 16 is a flowchart showing the glow plug energization process of steps S130 and S131. The glow plug energization process is performed in the same manner during the transition period of switching to the premixed combustion mode and during the transition period of switching to the diffusion combustion mode. In step S135, the ECU 70 judges whether or not the glow plug 32 is currently energized. In the case where the glow plug 32 is not currently energized (the result of the judgment in step S135 is "NO"), the ECU 70 starts the supply of electric current to the glow plug 32 (step S136). Also, the ECU 70 starts counting the energization time of the glow plug 32.

After having started energization of the glow plug 32, the ECU 70 returns to the engine control routine (FIG. 15) and continues the previous control (step S300). Namely, in the case where the glow plug 32 has not yet been energized, the ECU 70 delays performing the fuel injection control for the transition period of switching the combustion mode. The ECU 70 delays performing the fuel injection control for the transition period in order to prevent the fuel injection control for the transition period of switching the combustion mode from being started in a state in which the temperature of the engine 10 has not yet been sufficiently increased by the glow plug 32.

In the case where the ECU 70 determines in step S135 (FIG. 16) that the glow plug 32 is currently energized, the ECU 70 determines the cumulative time (energization time) elapsed after energization of the glow plug 32 has begun. In the case where the energization time of the glow plug 32 is equal to or less than a predetermined threshold (for example, on the order of several seconds), the ECU 70 judges that the temperature of the glow plug 32 has not been sufficiently raised. In this case, the ECU 70 returns to the engine control routine (FIG. 15) and continues the previous control (step S300).

Meanwhile, in the case where the energization time of the glow plug 32 exceeds the threshold, the ECU 70 judges that the temperature within the cylinder has been raised sufficiently. In this case, the ECU 70 returns to the engine control routine and starts the fuel injection control for the transition period of switching the combustion mode. Specifically, in the case of the glow plug energization process in step S130, the fuel injection control for premixed combustion during the transition period (step S200) is started, and in the case of the glow plug energization process in step S131, the fuel injection control for diffusion combustion during the transition period (step S250) is started.

The glow plug 32 used in the third embodiment reaches a temperature of 1200° C. within 3 seconds when energized as described in the first embodiment. Accordingly, the predetermined threshold used in the energization time judgment in step S137 is desirably 3 seconds or greater. Notably, the supply of electric current to the glow plug 32 may be stopped when a predetermined time (for example, several tens of seconds) has elapsed after the start of the supply of electric current; i.e., when the temperature within the cylinder of the engine 10 has been sufficiently raised.

As described above, in the engine control routine of the third embodiment, after the temperature within the cylinder of the engine 10 has been raised by the glow plug energization process, the fuel injection control for the transition period of switching the combustion mode is performed. In a state in which the temperature within the cylinder of the engine 10 has been sufficiently raised, as described below, the torque of the engine 10 increases, the cycle variation of the torque is suppressed, and the controllability of the fuel injection control during the transition period of switching the combustion mode can be enhanced.

Figure 17:
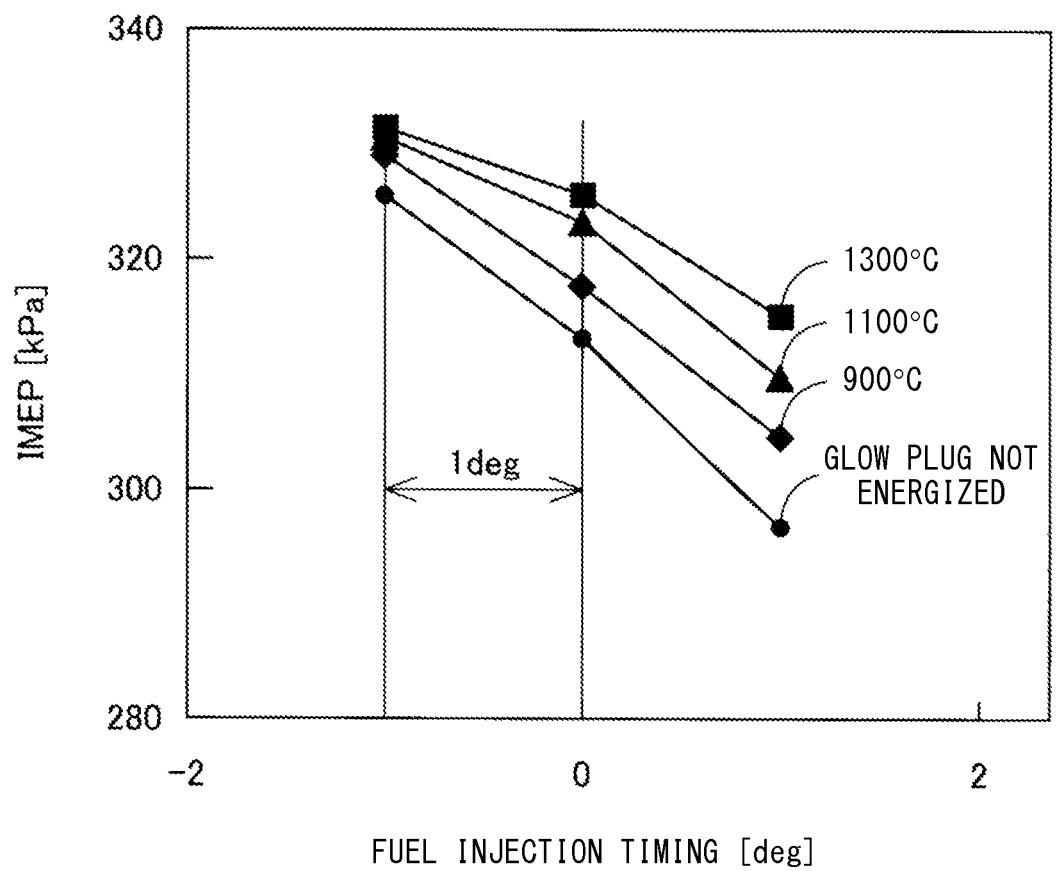
FIG. 17 is an explanatory graph showing the variation of torque of the engine due to energizing the glow plug.
Figure 18:
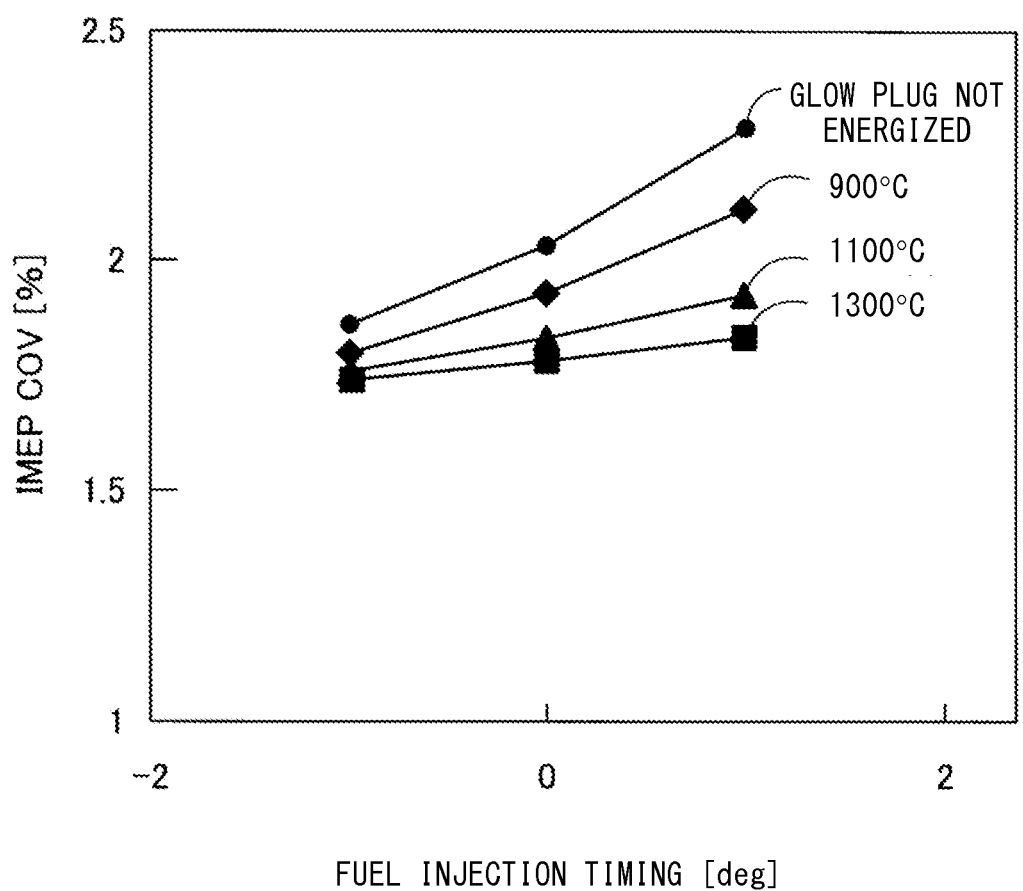
FIG. 18 is an explanatory graph showing the cycle variation of torque of the engine due to energizing the glow plug.

FIGS. 17 and 18 are graphs showing how the cycle variation of the torque of the engine 10 changes as a result of energizing the glow plug 32. In FIGS. 17 an 18, changes in the torque (indicated means effective pressure (IMEP)) and the cycle variation (IMEP COV %) at the fuel injection timing for the case where the EGR ratio set to about 40% in the premixed combustion mode are shown for each of different elevated temperatures of the glow plug 32. When the temperature within the cylinder exceeds at least 900° C., the cycle variation of the torque decreases (FIG. 18). Accordingly, when comparison is made for the same IMEP value, it is found that the fuel injection timing in the case where the glow plug 32 is energized can be retarded (delayed) by about 1 CA [deg] as compared with the fuel injection timing in the case where the glow plug 32 is not energized (FIG. 17).

As described above, in the case where the glow plug 32 is energized, the torque increases, and the cycle variation of the torque is suppressed as compared with the case where the glow plug 32 is not energized. Therefore, even when the fuel injection timing is shifted toward the retarded side by at least 1 CA [deg], the same torque and the same cycle variation of the torque can be realized. The combustion noise, NOx, THC, and opacity can be reduced further if the fuel injection timing can be controlled toward the retarded side by 1 CA [deg]. Such an effect can be attained not only in the premixed combustion mode, but also in the diffusion combustion mode.

As described above, according to the control apparatus of the third embodiment, the controllability of the fuel injection control during the transition period of switching the combustion mode can be enhanced by raising the temperature within the cylinder by the glow plug 32. Accordingly, the effect achieved by the fuel injection control during the transition period of switching the combustion mode as described in the first embodiment and the second embodiment can be attained at a higher level.

Figure 19:
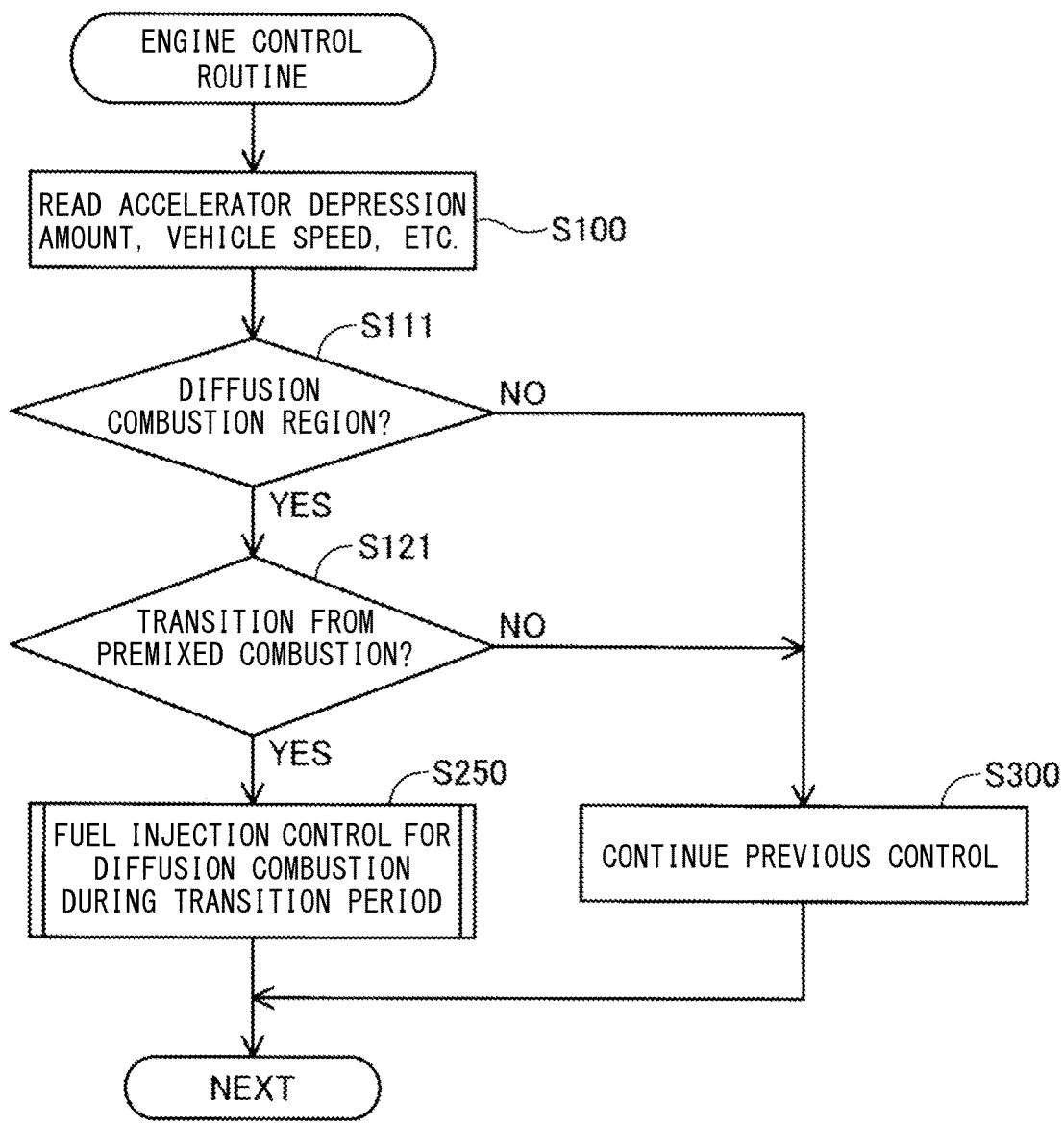
FIG. 19 is a flowchart showing an engine control routine according to a fourth embodiment.

D. Fourth Embodiment:

FIG. 19 is a flowchart of the engine control routine executed by a control apparatus which is a fourth embodiment of the present invention. The control apparatus of the fourth embodiment has a hardware configuration substantially the same as that of the control apparatus 100 of the first embodiment (FIGS. 1 and 2). The engine control routine executed by the control apparatus of the fourth embodiment is substantially the same as the control routine of the first embodiment (FIG. 3), except that the control processing in the premixed combustion mode is omitted. Namely, in the control apparatus of the fourth embodiment, during the transition period of switching to the premixed combustion mode from the diffusion combustion mode or the motoring state, the ECU 70 performs controls other than the fuel injection control based on the parameter related to a change in the cylinder pressure, such as the pressure increase rate maximum value dPmax, the mass fraction burned MFB, or the like.

As described in the first embodiment as well, the ECU 70 reads the accelerator depression amount α, the vehicle speed V, etc., as parameters representing the load of the engine 10 (step S100). Subsequently, from these parameters, the ECU 70 determines whether or not the engine load falls within the region within which the engine 10 is to be operated in the diffusion combustion mode (step S111). In step S111, a map similar to the map MP (FIG. 4) described in the first embodiment may be used.

In the case where the ECU 70 judges in step S111 that the engine load falls within the region within which the engine 10 is to be operated in the diffusion combustion mode (step S111: "YES"), the ECU 70 judges whether or not the present point in time is in the period of transition from the region in which the engine 10 is operated in the premixed combustion mode (S121). In the case where the present point in time is judged to be in the transition period of switching from the premixed combustion mode (step S121: "YES"), the ECU 70 performs the fuel injection control for diffusion combustion during transition periods (step S250). In step S250, the ECU 70 performs the fuel injection control based on the pressure increase rate maximum value dPmax of the first embodiment (FIG. 9).

In the case where the engine load is not judged to fall within the region within which the engine 10 is to be operated in the diffusion combustion mode (step S111: "NO"), or the present point in time is not judged to be in the transition period of switching from the premixed combustion mode (step S121: "NO"), the previous control is continued (step S300). The control continued in step S300 may be the ordinary fuel injection control in the premixed combustion mode or the ordinary fuel injection control in the diffusion combustion mode. Notably, the fuel injection control in the ordinary premixed combustion mode or the fuel injection control in the ordinary diffusion combustion mode may be well known controls. For example, a control in which the fuel injection timing is set in accordance with the load of the engine 10 may be performed.

As described above, according to the control apparatus of the fourth embodiment, the fuel injection timing is properly controlled based on the pressure increase rate maximum value dPmax during the transition period of switching from the premixed combustion mode to the diffusion combustion mode. Accordingly, the combustion during the transition period of switching the combustion mode is improved, whereby generation of combustion noise, NOx, and soot is suppressed.

E. Modifications:

E1. Modification 1:

In the above-described embodiments, the pressure increase rate maximum value dPmax is used as a parameter related to a change in the cylinder pressure. However, other parameters may be used as a parameter related to a change in the cylinder pressure. For example, a heat release rate maximum value dQmax may be used as a parameter related to a change in the cylinder pressure. The heat release rate dQ corresponds to the amount of heat released per a predetermined crank angle CA, and can be computed from the measured cylinder pressure P at intervals corresponding to the predetermined crank angle CA. Of the computed heat release rates dQ, the largest value in the combustion cycle is referred to as the heat release rate maximum value dQmax. Since the heat release rate maximum value dQmax is a parameter having a strong correlation with the pressure increase rate maximum value dPmax, fuel injection timing control similar to those of the first through fourth embodiments can be performed using the heat release rate maximum value dQmax. The second embodiment may be configured such that during the transition period of switching the combustion mode to the premixed combustion mode, control based on the heat generation rate maximum value dQmax is performed instead of control based on the pressure increase rate maximum value dPmax. Further, when the heat generation rate maximum value dQmax falls outside the control range of the control based on the heat generation rate maximum value dQmax, the control is switched to the fuel injection timing control based on the mass fraction burned MFB.

E2. Modification 2:

In the above-described embodiment, in the fuel injection control during the transition period of switching to the premixed combustion mode or the diffusion combustion mode, the fuel injection timing is controlled such that the parameter related to a change in the cylinder pressure, such as the pressure increase rate maximum value dPmax or the mass fraction burned MFB, falls within a predetermined target range. However, in the fuel injection control during the transition period of switching to the premixed combustion mode or the diffusion combustion mode, the fuel injection timing may be controlled such that the parameter related to change in the cylinder pressure, such as the pressure increase rate maximum value dPmax or the mass fraction burned MFB, becomes equal to a predetermined target value. The target range and the target value of the parameter related to a change in the cylinder pressure in the above described embodiments or the present modification 2 are not required to be determined to improve combustion noise, NOx, and opacity. The target range and the target value of the parameter may be determined such that the indexes (for example, the amounts of generation of carbon monoxide CO and hydrocarbon HC, and the amount of fuel consumption) indicating the state of combustion in the engine 10 other than combustion noise, NOx, and opacity are improved.

E3. Modification 3:

In the above-described embodiments, in the fuel injection control during the transition period of switching to the premixed combustion mode or the diffusion combustion mode, the fuel injection timing is feedback-controlled such that the parameter related to a change in the cylinder pressure, such as the pressure increase rate maximum value dPmax or the mass fraction burned MFB, falls within a predetermined target range. However, at least the fuel injection control during the transition period of switching from the premixed combustion mode to the diffusion combustion mode may be any of other types of controls, other than feedback control, which makes the parameter obtained from the signal of the cylinder pressure sensor fall within a predetermined range, so long as the control is performed based on the parameter obtained from the signal of the cylinder pressure sensor. In this case, preferably, the parameter obtained from the signal of the cylinder pressure sensor is at least one of the pressure increase rate maximum value dPmax and the heat generation rate maximum value dQmax. For example, a map in which at least one parameter of the pressure increase rate maximum value dPmax and the heat generation rate maximum value dQmax and the amount that the fuel injection timing is advanced or retarded are univocally related to each other is prepared in advance, and the fuel injection timing is controlled based on the parameter and with reference to the map. Alternatively, fuel injection timing may be controlled based on a plurality of parameters of the pressure increase rate maximum value dPmax and the heat generation rate maximum value dQmax. For example, the amount that the fuel injection timing is advanced or retarded is obtained based on each of the pressure increase rate maximum value dPmax and the heat generation rate maximum value dQmax. Further, a computation process of computing the average of the obtained amounts that the fuel injection timing is advanced or retarded is performed so as to calculate the control value of the fuel injection timing. The control of fuel injection timing is not limited to feedback control, and all types of closed-loop controls can be applied. Also, in the case where the reproducibility of change in the parameter with alteration of the fuel injection timing is sufficiently high, open-loop control may be employed.

E4. Modification 4:

In the above-described embodiments, the feedback control of fuel injection timing during the transition period of switching to the premixed combustion mode or the diffusion combustion mode is performed based on a previously prepared map which reflects the characteristics of the pressure increase rate maximum value dPmax, the mass fraction burned MFB, or the like. However, such a map is not required to be used in the feedback control of fuel injection timing during the transition period of switching to the premixed combustion mode or the diffusion combustion mode. For example, fuel injection timing may be controlled as follows. The upper limit value (for example, 800 kPa/deg) of the pressure increase rate maximum value dPmax is determined. When the pressure increase rate maximum value dPmax exceeds the upper limit, the fuel injection timing is controlled toward the retarded side by a predetermined crank angle CA (for example, 2 CAdeg). When the pressure increase rate maximum value dPmax is smaller than the upper limit, the fuel injection timing is controlled toward the advance side by a predetermined crank angle CA (for example, 1 CAdeg). In this manner, the fuel injection timing is feedback controlled. According to this method, the fuel injection timing can be controlled through simple judgment; i.e., by merely comparing the pressure increase rate maximum value dPmax with the upper limit. Hysteresis having a predetermined width may be provided for the upper limit.

E5. Modification 5:

In the feedback control of fuel injection timing of the above-described embodiments, the pressure increase rate maximum value dPmax or the heat release rate maximum value dQmax of a certain cylinder which is a target of control is obtained, and the fuel injection timing of that cylinder in the next combustion cycle is controlled using the obtained value. However, in the feedback control of fuel injection timing, the obtained pressure increase rate maximum value dPmax or heat release rate maximum value dQmax of a certain cylinder may be used for feedback control of fuel injection timing of another cylinder; for example, a cylinder for which fuel injection is performed next, rather than for feedback control of fuel injection timing of the certain cylinder in the next combustion cycle. Also, in the case where computation of the fuel injection timing is not completed in time, the computed fuel injection timing may be applied to a combustion cycle following the next combustion cycle.

E6. Modification 6:

In the fuel injection control during the transition period of switching to the diffusion combustion mode in the above-described embodiments, in the case where fuel injection timing converges in the feedback control based on the pressure increase rate maximum value dPmax or the heat generation rate maximum value dQmax, the fuel injection control is switched to ordinary fuel injection control performed in accordance with the load of the engine 10 (step S265 of FIG. 9). However, switching to fuel injection control based on a parameter other than the parameter related to the cylinder pressure may be omitted. In the diffusion combustion mode, the feedback control based on the pressure increase rate maximum value dPmax or the heat generation rate maximum value dQmax may be continued irrespective of convergence of fuel injection timing.

E7. Modification 7:

In the above-described embodiments, the cylinder pressure is measured by the glow plug 32 including a cylinder pressure sensor. However, the cylinder pressure sensor may be provided on the engine 10 independently of the glow plug 32. In this case, the layout of the cylinder pressure sensor can be freely set. In the above-described embodiment, the cylinder pressure sensor (glow plug 32) is provided for each cylinder. However, it is unnecessary to provide individual cylinder pressure sensors for all the cylinders. For example, the cylinder pressure sensor may be provided only for one or two of the four cylinders. The cylinder pressure or pressure increase rate maximum value dPmax of each of the cylinders for which the cylinder pressure sensor is not provided can be estimated from the values obtained from other cylinders. Alternatively, the fuel injection timing of each of the cylinders for which the cylinder pressure sensor is not provided may be controlled to follow the fuel injection timing of the cylinder for which the cylinder pressure sensor is provided.

E8. Modification 8:

In the above-described third embodiment, the glow plug energization process is performed before the fuel injection control during the transition period of switching to the premixed combustion mode and before the fuel injection control during the transition period of switching to the diffusion combustion mode (steps S130 and S131). However, the glow plug energization process is performed only in one of the transition period of switching to the premixed combustion mode and the transition period of switching to the diffusion combustion mode. Also, in the glow plug energization process, the judgment of the energization state of the glow plug 32 in step S135 and the judgment of the energization time in step S137 may be omitted. In this case, energization of the glow plug 32 is started before execution of the fuel injection control (during the transition period of switching the combustion mode) is started. Further, the fuel injection control during the transition period of switching the combustion mode is executed irrespective of the state of temperature rising of the glow plug 32. Also, the glow plug energization process of the third embodiment or the present modification 8 may be added to the engine control routine of the fourth embodiment (FIG. 19).

E9. Modification 9:

In addition to the above-described modifications, the configurations of the embodiments may be modified as follows. The glow plug 32 is not required to have a temperature rising performance of reaching 1200° C. within 0.5 to 3 sec. In the above-described embodiment, the glow plug 32 employs a ceramic heater. However, the glow plug 32 may employ a metal heater. The number of cylinders of the engine 10 is not limited to four, and the engine 10 may be a single-cylinder engine or a multi-cylinder engine such as a six-cylinder engine.

The present invention is not limited to the above-described embodiments and modifications, but may be embodied in various other forms without departing from the spirit of the invention. For example, in order to solve, partially or entirely, the above-mentioned problem or yield, partially or entirely, the above-mentioned effects, technical features of the embodiments and modifications corresponding to technical features of the modes described in the section "Summary of the Invention" can be replaced or combined as appropriate. Also, the technical feature(s) may be eliminated as appropriate unless the present specification mentions that the technical feature(s) is mandatory.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2014-144748 filed Jul. 15, 2014, incorporated herein by reference in its entirety.

What is claimed is:

1. A diesel engine control apparatus for controlling fuel injection timing of a diesel engine having a combustion cylinder, the control apparatus comprising:
   a cylinder pressure sensor for detecting a cylinder pressure of the diesel engine;
   a parameter computation unit which computes a parameter related to a change in the cylinder pressure of the diesel engine obtained from a signal output from the cylinder pressure sensor; and
   a control unit which performs a transition period control for controlling fuel injection timing such that the parameter falls within a target range during a transition time period when combustion in the diesel engine is switched from premixed combustion to diffusion combustion,
   wherein the transition period control includes determining a target value of a fuel injection amount and a target value of an exhaust gas recirculation (EGR) ratio for operation in diffusion combustion based on a required output of the diesel engine, and
   the transition period control decreases the target value of the EGR during the transition time period.

2. The diesel engine control apparatus as claimed in claim 1, wherein
   the parameter computation unit computes, as the parameter, a pressure increase rate maximum value of the cylinder pressure or a heat generation rate maximum value based on the signal output from the cylinder pressure sensor; and
   the control unit controls the fuel injection timing based on the pressure increase rate maximum value or the heat generation rate maximum value in the transition period control.

3. The diesel engine control apparatus as claimed in claim 1, wherein the transition period control is also performed when combustion in the diesel engine is switched from diffusion combustion to premixed combustion.

4. The diesel engine control apparatus as claimed in claim 2, wherein the transition period control is also performed when combustion in the diesel engine is switched from diffusion combustion to premixed combustion.

5. A diesel engine control apparatus for controlling fuel injection timing of a diesel engine, comprising:
   a cylinder pressure sensor for detecting cylinder pressure of the diesel engine; and
   a control unit which controls fuel injection timing, based on at least one of a pressure increase rate maximum value and a heat generation rate maximum value which are parameters obtained from a signal output from the cylinder pressure sensor, during a transition time period when combustion in the diesel engine is switched from premixed combustion to diffusion combustion,
   wherein the control unit is further configured to determine a target value of a fuel injection amount and a target value of an exhaust gas recirculation (EGR) ratio for operation in diffusion combustion based on a required output of the diesel engine, and
   the control unit is further configured to decrease the target value of the EGR during the transition time period.

6. The diesel engine control apparatus as claimed in claim 5, wherein the control unit controls the fuel injection timing such that at least one of the pressure increase rate maximum value and the heat generation rate maximum value falls within a target range, when combustion in the diesel engine is switched from premixed combustion to diffusion combustion.

7. The diesel engine control apparatus as claimed in claim 5, wherein the control unit controls the fuel injection timing based on of at least one of the pressure increase rate maximum value, the heat generation rate maximum value, and a mass fraction burned when combustion in the diesel engine is switched from diffusion combustion to premixed combustion.

8. The diesel engine control apparatus as claimed in claim 6, wherein the control unit controls the fuel injection timing based on of at least one of the pressure increase rate maximum value, the heat generation rate maximum value, and a mass fraction burned when combustion in the diesel engine is switched from diffusion combustion to premixed combustion.

9. The diesel engine control apparatus as claimed in claim 1, wherein the cylinder pressure sensor is incorporated into a glow plug provided on the diesel engine.

10. The diesel engine control apparatus as claimed in claim 5, wherein the cylinder pressure sensor is incorporated into a glow plug provided on the diesel engine.

11. The diesel engine control apparatus as claimed in claim 9, wherein the control unit energizes the glow plug such that a temperature of the glow plug is 900° C. or higher when combustion in the diesel engine is switched from premixed combustion to diffusion combustion.

12. The diesel engine control apparatus as claimed in claim 10, wherein the control unit energizes the glow plug such that a temperature of the glow plug is 900° C. or higher when combustion in the diesel engine is switched from premixed combustion to diffusion combustion.

13. The diesel engine control apparatus as claimed in claim 11, wherein the glow plug has a temperature rising speed such that the glow plug reaches 1200° C. within a period of 0.5 sec to 3 sec.

14. The diesel engine control apparatus as claimed in claim 12, wherein the glow plug has a temperature rising speed such that the glow plug reaches 1200° C. within a period of 0.5 sec to 3 sec.

15. A method for controlling fuel injection timing of a diesel engine, comprising:
    detecting a cylinder pressure of the diesel engine;
    computing, based on the detected cylinder pressure, a parameter which is related to change in the cylinder pressure of the diesel engine; and
    controlling the fuel injection timing such that the parameter falls within a target range during a transition time period when combustion in the diesel engine is switched from premixed combustion to diffusion combustion,
    wherein the method further comprises determining a target value of a fuel injection amount and a target value of an exhaust gas recirculation (EGR) ratio for operation in diffusion combustion based on a required output of the diesel engine, and
    the target value of the EGR is decreased during the transition time period.

16. A method for controlling fuel injection timing of a diesel engine, comprising:
    detecting a cylinder pressure of the diesel engine; and
    controlling fuel injection timing, based on at least one of a pressure increase rate maximum value and a heat generation rate maximum value which are parameters obtained from the cylinder pressure, during a transition time period when combustion in the diesel engine is switched from premixed combustion to diffusion combustion,
    wherein the method further comprises determining a target value of a fuel injection amount and a target value of an exhaust gas recirculation (EGR) ratio for operation in diffusion combustion based on a required output of the diesel engine, and
    the target value of the EGR is decreased during the transition time period.

17. The diesel engine control apparatus as claimed in claim 1, wherein a maximum value for the target EGR ratio is set for operation in premixed combustion and a minimum value for the target EGR ratio is set for operation in diffusion combustion.

18. The diesel engine control apparatus as claimed in claim 5, wherein a maximum value for the target EGR ratio is set for operation in premixed combustion and a minimum value for the target EGR ratio is set for operation in diffusion combustion.

19. The method for controlling fuel injection timing of a diesel engine according to claim 15, wherein a maximum value for the target EGR ratio is set for operation in premixed combustion and a minimum value for the target EGR ratio is set for operation in diffusion combustion.

20. The method for controlling fuel injection timing of a diesel engine according to claim 16, wherein a maximum value for the target EGR ratio is set for operation in premixed combustion and a minimum value for the target EGR ratio is set for operation in diffusion combustion.

* * * * *